United States Patent
Totsu

(10) Patent No.: US 6,584,876 B2
(45) Date of Patent: Jul. 1, 2003

(54) SCREW, DRIVER BIT AND HEADER PUNCH FOR MANUFACTURE OF SCREW

(76) Inventor: Katsuyuki Totsu, 32-13, Oshiage, 1-chome, Sumida-ku, Tokyo (JP)

(*) Notice: Subject to any disclaimer, the term of this patent is extended or adjusted under 35 U.S.C. 154(b) by 0 days.

(21) Appl. No.: 09/985,052

(22) Filed: Nov. 1, 2001

(65) Prior Publication Data

US 2002/0029666 A1 Mar. 14, 2002

Related U.S. Application Data

(63) Continuation of application No. 09/284,881, filed as application No. PCT/JP97/02237 on Jun. 27, 1997, now Pat. No. 6,341,546.

(30) Foreign Application Priority Data

Oct. 24, 1996 (JP) .............................................. 8-282352
Jan. 20, 1997 (JP) .............................................. 9-007984

(51) Int. Cl.[7] .............................................. B25B 23/00
(52) U.S. Cl. ......................................... 81/460; 411/404
(58) Field of Search .................. 81/460, 436; 411/403, 411/404; 470/63

(56) References Cited

FOREIGN PATENT DOCUMENTS

| JP | 49-58955 | 5/1974 |
|---|---|---|
| JP | 56-62412 | 5/1981 |
| JP | 61-122409 | 8/1986 |

*Primary Examiner*—D. S. Meislin

(57) ABSTRACT

A driver bit and a header punch for manufacture of screws comprising a screw comprising substantially vertical end wall portions of predetermined depth formed on an end edge portion of a bit fitting groove on a screw head, non-planar bottom portions raised from lower edge portions of the vertical end wall portions toward a center of the screw head, inclined groove portions extending from raised portions of the non-planar bottom portions toward a center of a screw neck, a substantially conical-shaped bottom surface formed on a bottom of the groove, the bit fitting groove being adapted to a driver bit, which has a blade adapted to be fitted into the bit fitting groove and has a lower edge portion of the blade adapted to abut against the non-planar bottom portions. In this manner, groove portions of a cross groove on the screw are improved in construction, whereby it is possible to effectively prevent a driver bit from coming out, prevent breakage of screws caused in the prior art, always achieve an appropriate and rapid screw fastening work even when the cross groove of the screw is broken, and to significantly enhance an efficiency in work.

11 Claims, 18 Drawing Sheets

(a)

(b)

(c)

US 6,584,876 B2

SCREW, DRIVER BIT AND HEADER PUNCH FOR MANUFACTURE OF SCREW

This is a continuation of application Ser. No. 09/284,881, filed Apr. 22, 1991, now U.S. Pat. No. 6,341,546, which is a National Stage Application of PCT/JP97/02237 Jun. 27, 1997, both of which are incorporated herein by reference.

BACKGROUND OF THE INVENTION

A. Field of the Invention

The present invention relates to a screw and a driver bit used for the screw. Especially, the present invention relates to a screw having a bit fitting groove that is suitable for both a Phillips® screwdriver and a flat blade screwdriver, and a driver bit used for the screw. More specifically, the present invention relates to a screw having a cross groove formed on the top thereof and a driver bit suitable for the screw, which can engage tightly each other so as to realize quick and secure fastening and loosening by constant and appropriate torque transmission, as well as a header punch for manufacture of screws.

B. Description of the Related Art

Conventionally, a general combination of a screw and a driver bit having a configuration shown in FIGS. 29–32 is known. FIGS. 29 and 30 show a conventional screw having a cross groove, FIG. 31 shows a driver bit for the screw having a cross groove, and FIG. 32 shows a state in which the screw and the driver bit are engaged with each other.

The conventional screw 10 shown in FIG. 29 has a cross groove 12 on the screw head 10a. This cross groove 12 has inclined groove portions 12a extending from the edge portion to the center of the neck portion 12b and a bottom portion with a substantially conical-shaped bottom surface 14 as a gentle slope. Reference numeral 13 denotes tapered wall portions formed between neighboring cross grooves 12. This tapered wall portions 13 abut and engage a blade of a driver bit mentioned below. On a corner portion neighboring each of the inclined groove portions 12a, a tapered connection surface 17a or 17b is formed respectively, which extends from the position of the conical-shaped bottom surface 14 to the opening rim portion of the cross groove 12 at the screw head 10a. These tapered connection surfaces 17a and 17b are also adapted to engage a part of the blade of a driver bit mentioned below.

On the other hand, the conventional driver bit 20 shown in FIG. 31 has blades 22 for engaging the cross groove 12 of the screw 10 and extension blade 22a adapted to the contour of the inclined groove portions 12a extending from the end edge portion of the cross groove 12 toward the center of the screw neck 12b. The reference numeral 23 denotes tapered walls formed on both side surfaces of the blade 22 and the extension blade 22a. This tapered wall 23 abuts and engages the tapered wall portions 13 formed on the cross groove 12 of the screw 10.

The conventional combination of the screw and the driver bit having above-mentioned configuration, as shown in FIG. 32, when the screw 10 engages the driver bit 20, the blades 22 and extension blades 22a of the driver bit 20 fit in the inclined groove portions 12a of the cross groove 12, and the side walls 23 of the blades 22 and extension blades 22a abut the tapered walls 13 of the cross groove 12 of the screw 10. Thus, a desired torque is transmitted to the screw 10 by rotating the driver bit 20. Namely, the screw can be fastened to or loosened from an object.

In addition, a plus-and-minus screw (i.e., a screw with a cross grooved and slotted head) 10 having a configuration shown in FIGS. 33 and 34 is known, for example, as a screw having a fitting groove that can be fit both a Phillips® screwdriver bit and a flat-blade screwdriver bit. As a screwdriver bit that is used for the plus-and-minus screw 10, the Phillips® screwdriver bit 20 having the configuration shown in FIG. 31 is used. FIG. 35 shows a state in which the plus-and-minus screw 10 and the Phillips® screwdriver bit 20 engage each other.

The plus-and-minus screw 10 has an advantage in that a conventional flat-blade screwdriver can also be used.

Therefore, the conventional plus-and-minus screw 10 shown in FIG. 33 and 34 has a cross groove, i.e., a fitting groove 12 on the screw head 10a. This fitting groove 12 consists of a pair of linear grooves 12a and 12b crossing in the center of the screw head 10a. One linear groove 12a is adapted to abut and engage the blade of a Phillips® screwdriver, and the other groove 12b is adapted to abut and engage the blade of a flat-blade screwdriver.

The linear groove 12a includes an inclined groove portions 12a extending from the edge rime portion to the center portion of the screw neck 10b and the substantially conical-shaped bottom surface 14 formed as a gentle slope at the bottom. Both sides of the inclined groove portions 12a is provided with tapered walls 13a having a taper toward the bottom. This tapered wall 13a abuts and engages the blade of the Phillips® screwdriver bit as explained below.

In addition, the other linear groove 12b is formed as a horizontal groove (12a) that has a sufficient width and depth for abutting and engaging the blade of the flat-blade screwdriver bit. Both sides of the horizontal groove 12a is provided with vertical walls 13b that extend substantially vertically toward the bottom. This vertical wall 13b abuts and engages the blade of the conventional flat-blade screwdriver bit.

The corner portions between the linear groove (the inclined groove) 12a and the other linear groove (the horizontal groove) 12b neighboring thereof are provided with tapered connection surfaces 17a and 17b. A part of the blade of the drive bit mentioned below also abut and engage the tapered connection surfaces 17a and 17b.

Therefore, the conventional Phillips® screwdriver bit 20 shown in FIG. 31 has a blade 22 that engages the fitting groove 12 of the plus-and-minus screw 10 and am extension blade 22a extending so as to fit the contour of the inclined groove portions 12a extending from the edge portion of the fitting groove 12 to the center portion of the screw neck 10b. The reference numeral 23 denotes the tapered wall portions formed at both side surfaces of the blade 22 and extension blade 22a. Namely, this tapered wall portion 23 abuts and engages the tapered wall 13a formed on one of the inclined groove portions 12a of the fitting groove 12 of the plus-and-minus screw 10.

According to the combination of the conventional plus-and-minus screw and the Phillips® screwdriver bit, as shown in FIG. 35, when the plus-and-minus screw 10 and the Phillips® screwdriver bit 20 are engaged with each other, the blades 22 and the extension blade 22a of the Phillips® screwdriver bit 20 fit in the fitting groove 12 as mentioned above. One of the pair of the blade 22 and the tapered wall 23 of the extension blade 22a abuts the tapered wall 13a formed on one of the inclined groove portions 12a of the plus-and-minus screw 10. Thus, when the Phillips® screwdriver bit 20 is rotated, a desired torque is transmitted to the plus-and-minus screw 10. Namely, the plus-and-minus screw 10 can be fastened to or loosened from an object.

However, according to the combination of the conventional screw (the plus-and-minus screw) 10 and the driver bit (the Phillips® screwdriver bit) 20, as shown in FIG. 32 (FIG. 35), the cross groove 12 of the screw head 10a has an inclined groove portions 12a extending from the edge portion to the center of the screw neck 10b. On the other hand, the corresponding driver bit 20 is adapted so that the edge line portion of the extension blade 22a fit to the contour of the inclined groove portions 12a to engage the cross groove (the fitting groove) 12. In addition, the width of the edge line portion of the extension blade 22a increases little by little from the front to the rear.

Furthermore, since the tapered wall 23 formed on each blade 22 of the driver bit 20 also abuts and engages the tapered wall 13 formed on the cross groove 12 (the inclined groove portions 12a) of the screw (the plus-and-minus screw) 10, when the driver bit 20 is rotated in a predetermined direction, the contact state of the driver bit 20 with the cross groove 12 (inclined groove portions 12a) is such as a tapered contact in the entire surface. Therefore, the tip of the driver bit 20 has a tendency to come out along the slant surface of the inclined groove portions 12a of the cross groove 12 (as shown with an arrow in FIG. 32). This phenomenon is called a come-out phenomenon.

Especially, the contour of the cross groove (the fitting groove) of the conventional screw, as shown in FIG. 30 (FIG. 34), has the width of the cross groove (the fitting groove) 12 that is relatively larger than the width of the edge line portion of the extension blade 22a of the driver bit 20, for example, in order to make easy engagement of the blade tip of the driver bit 20, while the area of tapered wall 13 (and the vertical wall 13b ) and the tapered connection surface 17a, 17b that are formed on the boundary portion between the neighboring cross grooves 12, 12 (between the linear grooves 12a and 12b crossing each other) or on the corners is relatively small. Therefore, when rotating the driver bit 20, the tapered wall 13 (and the vertical wall 13b ) and the tapered connection surface 17a, 17b are loaded with much stress, and the tapered wall 13(and the vertical wall 13b) and the tapered connection surface 17a, 17b will be broken little by little as shown by the hatching portion 15 in FIG. 30 (FIG. 34), if the fastening resistance is large. If the breakage portion (15) is enlarged, the come-out phenomenon of the driver bit 20 occurs frequently, and finally fastening operation becomes impossible.

From the above-mentioned view point, a strong pressure of the driver bit 20 against the screw groove portion 12a is necessary to prevent the come-out phenomenon of the driver bit 20 when rotating the driver bit 20. However, if the object to which the screw is fastened is such as a fine component, the object can be broken or damaged, while there is no problem if the object has a high stiffness like a metal.

In addition, if the come-out phenomenon occurs, abrasion of the tip portion of the bit, i.e., the blade 22 and the extension blade 22a is accelerated, and the abrasion causes more occurrence of the come-out phenomenon and further breakage of the screw groove.

Furthermore, if the excessive force is added to the driver bit 20 to prevent the come-out phenomenon, it becomes difficult to transmit a correct torque to the screw. Namely, the force added to the driver bit 20 my varies depending on an operator. As a result, the fastening torque of the screw may vary.

Still furthermore, if the screw is a tapping screw, a propulsion friction is added to a rotation friction of the screw when the screw is fastened to an object such as a plastic. Therefore, the object is heated so that the hardness of the fastening portion of the object may be lowered, or the object to which the screw is fastened may be broken.

On the other hand, the operation of rotating and pressing the driver bit 20 simultaneously is a difficult and tiresome job for the operator when fastening the screw.

In addition, according to the combination of the conventional screw 10 and the driver bit 20, it is difficult to maintain the state where the axis of the screw is coaxial with the axis of the driver bit when fitting the tip of the bit with the screw groove while performing the rotation of the screw when using a manual or electric tool for fastening the screw. If the axis of the driver bit is inclined from the axis of the screw, the come-out phenomenon will occur frequently, and the screw groove may be broken easily.

Furthermore, the come-out phenomenon and the breakage of the screw groove may occur when loosening the screw, too. In this case, it becomes impossible to remove the screw without partly breaking the object to which the screw is fastened. Especially, when the screw groove is blocked with dust or others, the above-mentioned phenomenon occurs easily.

SUMMARY OF THE INVENTION

Therefore, the object of the present invention is to provide a screw, a driver bit and a header punch for manufacture of screw that can prevent the come-out phenomenon of the driver bit effectively by improving the configuration of the groove portion of the cross groove of the screw in the combination of the screw and the driver bit, so as to prevent the breakage of the screw that conventionally occurs, and to perform a correct and quick fastening of the screw normally even if the partial breakage occurs in the cross groove of the screw, so that the operation efficiency can be improved significantly.

In addition, another object of the present invention is to provide a combination of a plus-and-minus screw and a driver bit as well as a header punch for manufacture of screw that can prevent the come-out phenomenon of the driver bit effectively by improving the configuration of the groove portion of the bit fitting groove of the screw in the combination of the plus-and-minus screw and the driver bit, so as to prevent the breakage of the screw that conventionally occurs, and to perform a correct and quick fastening of the screw normally even if the partial breakage occurs in the bit fitting groove of the screw, so that the operation efficiency can be improved significantly.

A screw according to the first invention is characterized in that substantially vertical end wall portions of predetermined depth are formed on an end edge portion of a bit fitting groove on an screw head, non-planar bottom portions are raised from lower edge portions of the vertical end wall portions toward the center of the screw head, inclined groove portions are formed extending from the raised portions of the non-planar bottom portions toward the center of the screw neck, a substantially conical-shaped bottom surface is formed on the bottom of the groove, and the bit fitting groove is adapted to a driver bit that has a blade fitting in the bit fitting groove and abutting to the non-planar bottom portions at the lower edge.

In this case, the bit fitting groove in which the blade of the Phillips® screwdriver bit fits can be formed as a groove whose width is enlarged little by little from the center of the screw head to the outer portion in the radial direction, so that the angle between the opposing side walls of the neighboring grooves is a little smaller than 90 degrees.

A driver bit that is adapted to the screw is characterized in that a tip potion of the bit has a flat blade provided with substantially vertical end edge portions fitting in along the vertical end edge portion of the bit fitting groove of the screw head, and the tip edge surface of the blade is substantially horizontal surface with a protrusion formed at the center of the horizontal surface.

In this case, if the bit fitting groove of the screw, in which the blade of the Phillips® screwdriver bit fits, is formed as the groove whose width is enlarged little by little, the driver bit adapted to the screw preferably has the flat blade whose tip portion has side walls of the shape adapted to the groove whose width is enlarged little by little forming the bit fitting groove of the screw.

In addition, each end edge portion of the flat blade has the right-angled edge or an acute-angled edge crossing the horizontal surface of the blade tip and protruding a little in the horizontal surface side.

Furthermore, the protrusion formed at the center of the horizontal surface of the flat blade can be formed in the shape that is adapted to the inclined groove portions and the conical-shaped bottom surface formed at the center of the bit fitting groove of the screw.

A header punch for manufacture of the screws includes protrusions for forming the vertical edge wall portions of the bit fitting groove of the screw head and forming the non-planar bottom portions raised from the lower edge portion of the vertical edge wall portion toward the center of the screw head. The header punch also includes protruding lines for forming grooves extending with inclined or curved from the protrusion toward the center of the screw neck.

If the bit fitting groove of the screw is formed as the groove whose width is enlarged little by little, side walls of the protrusion for forming the bit fitting groove are preferably shaped to be adapted to the groove whose width is enlarged little by little.

According to the screw of the first invention having the above-mentioned configuration, substantially vertical end wall portions of predetermined depth are formed on an end edge portion of the bit fitting groove on an screw head, non-planar bottom portions are raised from lower edge portions of the vertical end wall portions toward the center of the screw head, inclined groove portions are formed extending from the raised portions of the non-planar bottom portions toward the center of the screw neck. Therefore, concerning the engagement of the blade tip of the driver bit with the bit fitting groove, a contact area of the tapered contact with the entire bit fitting groove is small. In addition, since the non-planar bottom surface is formed so that the area of the wall portions that the tip of the driver bit abuts at the boundary portion where the neighboring bit fitting grooves cross each other is enlarged, the come-out phenomenon of the driver bit is prevented securely.

In addition, the driver bit of the first invention includes a tip potion having a flat blade provided with substantially vertical end edge portions fitting in along the vertical end edge portion of the bit fitting groove of the screw head, and the tip edge surface of the blade is substantially horizontal surface with a protrusion formed at the center of the horizontal surface. Therefore, the driver bit that is the most adapted to the screw is provided.

Furthermore, the screw of the first invention can be manufactured easily by using the header punch having the protrusion and the protruding lines that are adapted to the contour of the bit fitting groove.

A plus-and-minus screw of the second invention has a bit fitting groove of a cross groove formed in the screw head. One of crossing linear grooves making up the bit fitting groove is formed so as to be adapted to a blade of a Phillips® screwdriver bit, while the other linear groove is formed so as to be adapted to a blade of a flat-blade driver bit. The plus-and-minus screw of the first invention is characterized in that substantially vertical wall portions having predetermined depth are formed at the end edge portion of the linear groove adapted to the blade of the Phillips® screwdriver bit, and the bit fitting groove is formed so as to be adapted to a driver bit having a blade that fits in one of the linear grooves and abuts the bottom of the groove at the lower edge when the blade tip of the Phillips® screwdriver bit engages the bit fitting groove.

In this case, the bottom portion of one of the linear groove adapted to the blade of the Phillips® screwdriver bit can have inclined groove portions extending from the lower edge of the vertical edge wall formed at the end edge portion of the groove toward the center of the screw head and a substantially conical-shaped bottom surface formed at the center bottom.

In addition, the bottom portion of one of the linear grooves can have a non-planar bottom portion raised from the lower edge of the vertical edge wall formed at the end edge portion of the linear groove toward the center of the screw head, inclined groove portions that extends from the raised portion of the non-planar bottom portion toward the center of the screw head, and a substantially conical-shaped bottom surface formed at the center bottom portion thereof.

Furthermore, the bottom portion of one of the linear groove can be formed as an inclined bottom surface inclined downward from the end edge portion of the of the vertical edge wall formed at the end edge portion of the groove toward the center of the screw neck, and a substantially conical-shaped bottom surface can be formed at the center bottom.

Furthermore, the bit fitting groove that the blade of the Phillips® screwdriver bit fits in and engages can have linear grooves, one of which is formed as a groove whose width is enlarged little by little from the center of the screw neck to the outer portion in the radial direction, and the width of the other linear groove is widened little by little from the center of the screw neck to the outer portion in the radial direction, so that an angle between the opposing wall portions of the neighboring grooves can be a little smaller than 90 degrees.

On the other hand, a driver bit adapted to the above-mentioned plus-and-minus screw is characterized in that a flat blade having substantially vertical end edge portions fitting in along the vertical wall portions of the linear groove of the screw head is provided to the tip portion, and the tip edge surface of the blade is substantially horizontal surface with a protrusion formed at the center of the horizontal surface.

If the bit fitting groove of the screw is formed as the groove whose width is enlarged little by little, the driver bit adapted to the screw preferably has the flat blade whose tip portion has side walls of the shape adapted to the groove whose width is enlarged little by little forming the bit fitting groove of the screw.

In addition, each end edge portion of the flat blade of the driver bit preferably has the right-angled edge or an acute-angled edge crossing the horizontal surface of the blade tip and protruding a little in the horizontal surface side.

Furthermore, the protrusion formed at the center of the horizontal surface of the driver bit is preferably formed in the shape that is adapted to the inclined groove portions and the conical-shaped bottom surface formed at the center of the bit fitting groove of the plus-and-minus screw.

A header punch for manufacture of the plus-and-minus screws includes protrusions crossing each other for forming the vertical edge wall portion of the bit fitting groove of the screw head and forming a predetermined groove bottom portion extending from the lower edge portion of the vertical edge wall portion toward the center of the screw head. The header punch also has protruding lines for forming the grooves extending with inclined or curved from the protrusions toward the center of the screw neck.

If the bit fitting groove of the screw is formed as the groove whose width is enlarged little by little, side walls of the protrusions for forming the bit fitting grooves are preferably shaped to be adapted to the groove whose width is enlarged little by little.

According to the plus-and-minus screw of the second invention having the above-mentioned configuration, substantially vertical end wall portions of predetermined depth are formed on an end edge portion of the bit fitting groove made of one of the linear grooves on an screw head. Therefore, concerning the engagement of the blade tip of the Phillips® screwdriver bit with the bit fitting groove, a contact area of the tapered contact with the linear groove is partial and small. In addition, since a bottom portion of the bit fitting groove is formed so that the area of the wall portions that the tip of the driver bit abuts is enlarged, the come-out phenomenon of the driver bit is prevented securely.

In addition the driver bit of the second invention includes a tip potion having a flat blade provided with substantially vertical end edge portions fitting in along the vertical end edge wall portion of the bit fitting groove consists of one of the linear grooves on the screw head, and the tip edge surface of the blade is substantially horizontal surface with a protrusion formed at the center of the horizontal surface. Therefore, the driver bit that is the most adapted to the plus-and-minus screw is provided.

Furthermore, the screw of the second invention can be manufactured easily by using the header punch having the protrusions and the protruding lines that are adapted to the contour of the bit fitting groove, especially one of the linear grooves.

Furthermore, a driver bit for a plus-and-minus screw of a third invention is a driver bit for a plus-and-minus screw adapted to a plus-and-minus screw having a bit fitting groove formed by a pair of linear grooves consist of an inclined groove portion and a horizontal groove portion crossing each other at the center of the screw head. The driver bit for a plus-and-minus screw is characterized in that the driver bit has a flat blade with an inclined end edge portions fitting in along the inclined groove portions of the plus-and-minus screw, and another flat blade crossing the flat blade perpendicularly to fit in along the horizontal groove of the plus-and-minus screw, and has a horizontal end edge portion extending substantially perpendicularly and abutting the bottom portion of the horizontal groove. The center portion of the tip of each blade is provided with a protrusion that fit in the conical-shaped bottom surface formed in the center of the screw head of the plus-and-minus screw.

In this case, the protrusion formed at the tip center of each flat blade can be formed in shape that is adapted to the groove portion and the conical-shaped bottom surface formed at the center of the bit fitting groove of the plus-and-minus In addition, the flat blade that fits in along the horizontal groove of the plus-and-minus screw and has a horizontal end edge portion extending substantially perpendicularly to abut the bottom portion of the horizontal groove is preferably formed so that the width of the blade is adapted to the width of the horizontal groove.

DETAILED DESCRIPTION OF THE PREFERRED EMBODIMENTS

Reference will now be made in detail to the present preferred embodiments of the invention illustrated in the accompanying drawings. Wherever possible, the same reference numbers are used throughout the drawings to refer to the same or like parts.

FIRST EXAMPLE

Screw (1)

Figure 1:
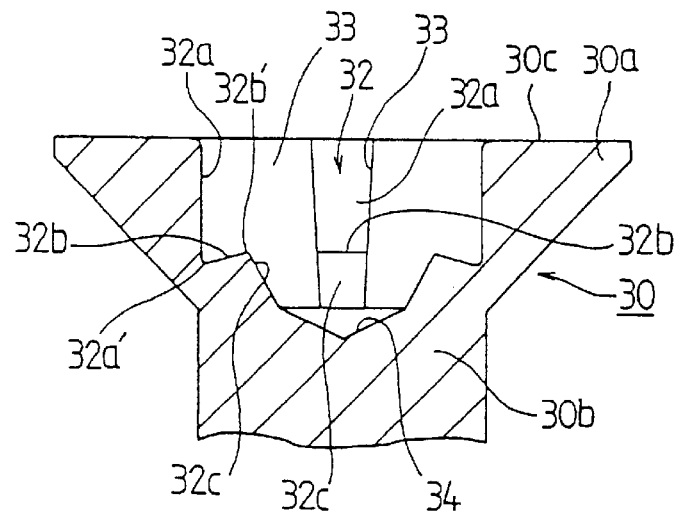
FIG. 1 is a cross section of a side view of a principal portion showing an example of a screw according to the present invention.
Figure 2:
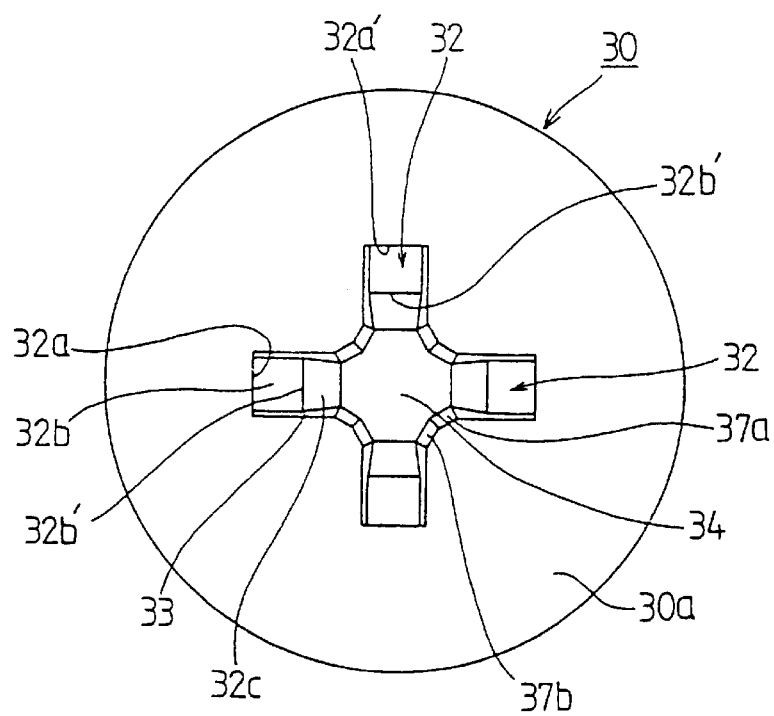
FIG. 2 is a top view of the screw head shown in FIG. 1.

FIGS. 1 and 2 show an example of a screw according to the present invention. Namely, in FIGS. 1 and 2, reference numeral 30 shows a screw of the present invention. A screw head 30a of the screw 30 includes a head or top surface 30c extending along a direction substantially perpendicular to a central axis of the screw 30 and is provided with bit fitting grooves 32. The bit fitting grooves 32 are arranged to cross each other like a plus (+) mark at the center of the screw head 30a.

This bit fitting groove 32 has a configuration in which a vertical end wall portion 32a having a predetermined depth is formed at the end edge portion of the groove, a inclined bottom portion 32b is formed, which is raised from a lower edge portion 32a' of the end wall portion 32a toward a central axis of the screw head 30a, an inclined groove portion 32c is formed from the raised portion 32b' of the inclined bottom portion 32b so as to extend toward the central axis of the screw head portion 30b, and a substantially conical-shaped bottom surface 34 having a gentle slope at the bottom portion is formed.

Reference numeral 33 denotes a substantially vertical side wall portion having an angle of 1.5–2.0 degrees so as to form an appropriate draft, which corresponds to a taper of a header punch formed on neighboring side wall portions of the bit fitting grooves 32. Therefore, this side wall portion 33 abuts and engages the side wall portion of the blade of a driver bit mentioned below.

Figure 30:
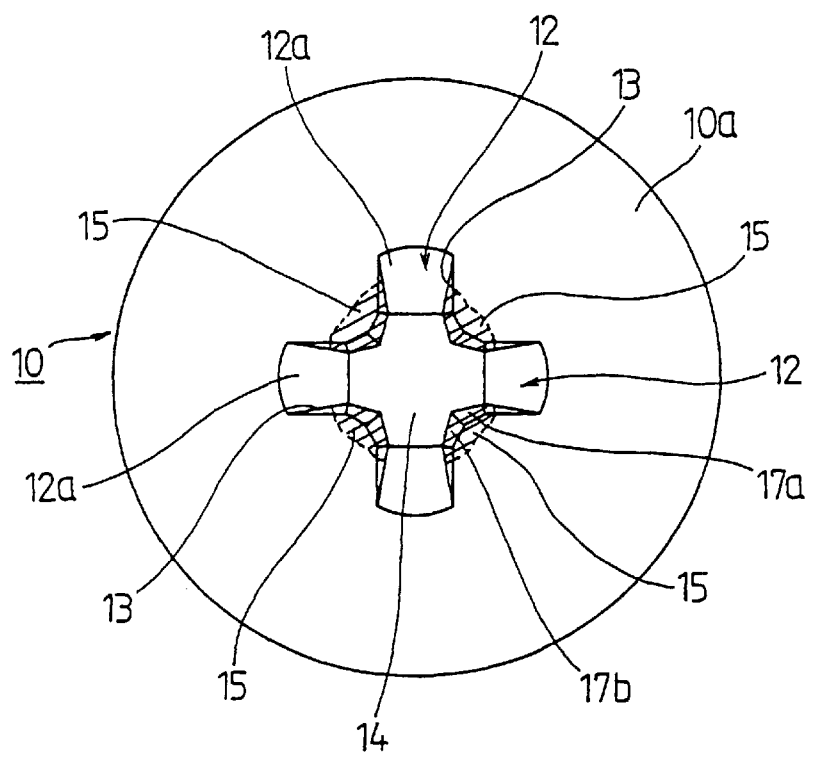
FIG. 30 is a top view of the screw head of the screw having a cross groove shown in FIG. 29.

In addition, at each corner adjacent to the bit fitting grooves 32, similarly to the conventional screw with cross groove shown in FIG. 30, tapered connection surfaces 37a and 37b are formed, which extends from the position of the conical-shaped bottom surface 34 to the opening end of the bit fitting groove 32 at the screw head 30a.

As mentioned above, the screw 30 of the present example has inclined bottom portions 32b at the end edge portions of the bit fitting groove 32, inclined groove portions 32c that extend from the raised portion 32b' of the non-planar bottom portion 32b toward the center of the screw head portion 30b. Therefore, tapered contact area of the entire bit fitting groove 32 is partial and small. In addition, the area of the side wall portion 33 to which a tip of a drive bit abuts at the boundary between the neighboring bit fitting grooves 32 and 33 (the area of the driving surface that the driver bit apply a rotation drive force to the screw) can be enlarged.

In addition, the width of the bit fitting groove 32 is adapted to the thickness of the blade of the driver bit mentioned below. The width is preferably a little larger than the above mentioned thickness in consideration of plating or coating of the surface of the screw.

Screw (2)

Figure 3:
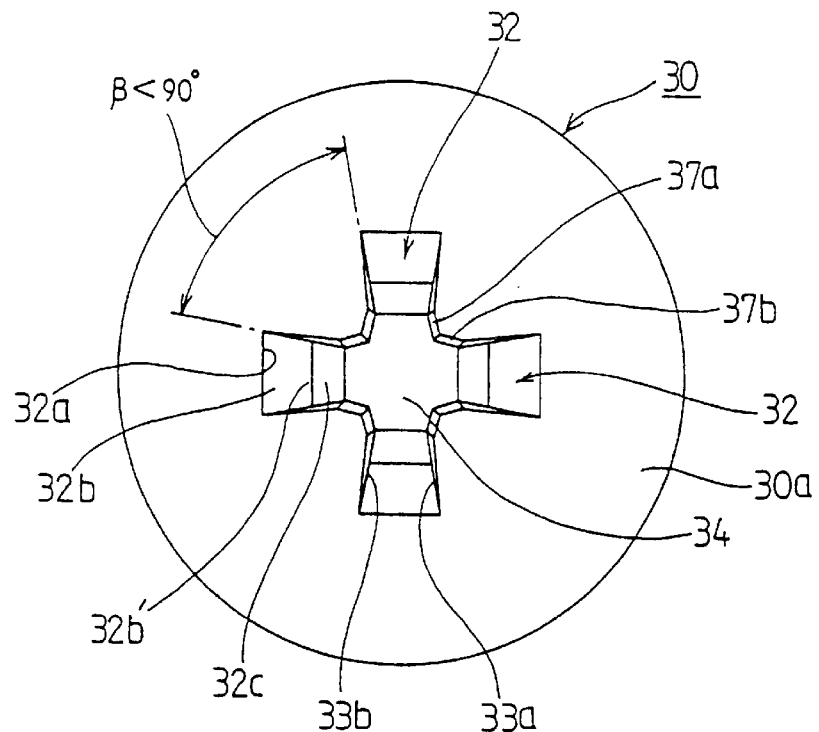
FIG. 3 is a top view of the screw head showing another example of a screw according to the present invention.

FIG. 3 shows another example of the screw 30 of the present invention. In this example, at the opposing side wall portions 33 of the bit fitting groove 32 of the screw 30, the width is enlarged little by little from the central axis of the screw head 30a to the outer portion in the radial direction so as to form tapered sidewall portions 33a and 33b of grooves 32.

As mentioned above, the screw 30 of the present example has tapered sidewall portions 33a and 33b of grooves 32 whose width is enlarged little by little, so that the opening angle β of the opposing side wall portions of the neighboring grooves is set a little smaller than 90 degrees. Thus, in combination with a driver bit mentioned below, come-out phenomenon from the bit fitting groove 32 of the screw 30 can be prevented effectively.

Driver Bit (1)

Figure 4:
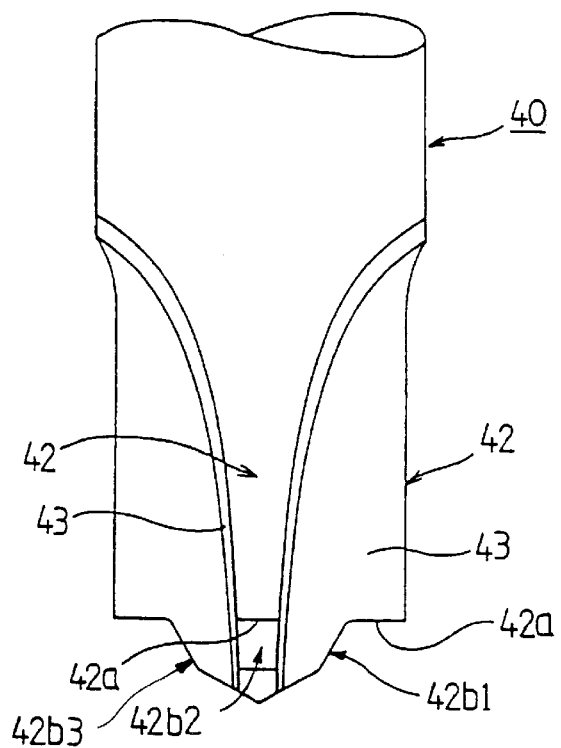
FIG. 4 is a side view of a principal portion showing an example of a driver bit according to the present invention.

FIG. 4 shows an example of a driver bit 40 adapted to the screw 30 explained with reference to FIGS. 1 to 3. The driver bit 40 of the present example has a blade 42 that engages the bit fitting grooves 32 of the screw 30, and have horizontal surfaces 42a, alternatively referred to as tip surfaces extending substantially perpendicularly to engage the vertical end wall portions 32a and the (non-planar) bottom portions 32b formed at the end edge portions of the bit fitting grooves 32. The driver bit 40 also has a number of protrusions. For example, the driver bit 40 has four protrusions in one embodiment, with the three protrusions 42b1, 42b2, and 42b3 shown in FIG. 4. These protrusions are adapted to the inclined groove portions 32c extending from the raised portions 32b' of the non-planar bottom portions 32b of the bit fitting groove 32 toward the center of the screw neck 30b.

Reference numeral 43 denotes a substantially vertical side wall portions with a permitted little taper formed at both side surfaces of the blades 42 or the horizontal surface portions 42*a*. These side wall portions 43 abut and engage the side wall portions 33 formed at the bit fitting grooves 32 of the screw 30 mentioned above. Therefore, engagement of these driving surfaces can provide sufficient engaging area, so that the come-out phenomenon that occurs in the conventional combination of screw and driver bit can be prevented effectively.

Figure 31:
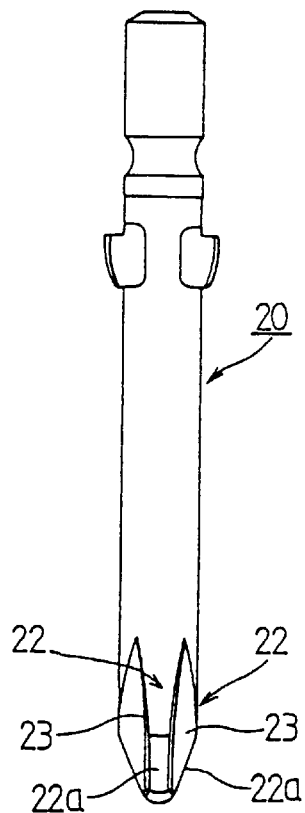
FIG. 31 is a side view of a principal portion of a driver bit for a screw having a cross groove.
Figure 32:
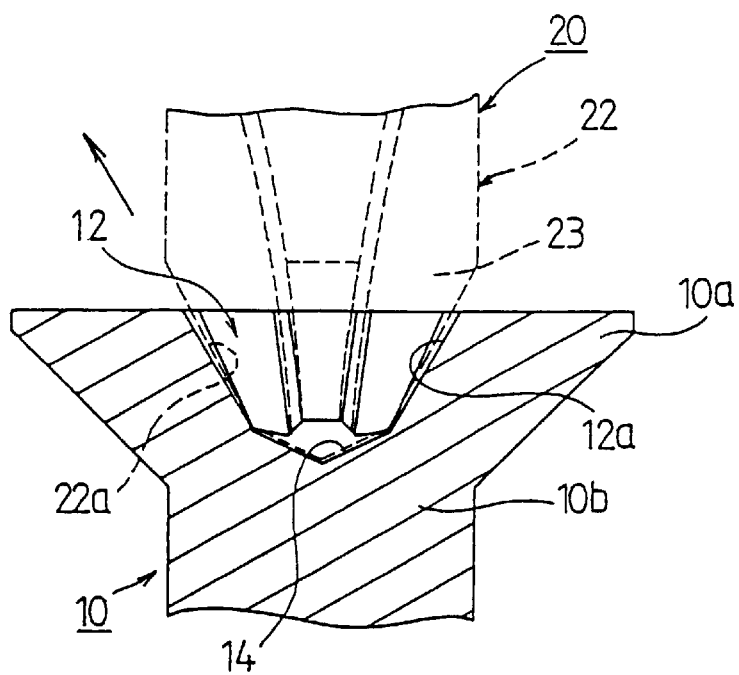
FIG. 32 is a cross section of a side view of a principal portion showing a connection state of the screw shown in FIG. 29 and the driver bit shown in FIG. 31.

Furthermore, in the above-mentioned screw 30, the tapered connection surfaces 37*a* and 37*b* are formed at the neighboring corner portions of the bit fitting groove 32 in the same way as the conventional screw. Therefore, even if the conventional driver bit for screws with cross groove as shown in FIG. 31 is used, for example, a part of the blade of the drive bit abuts and engages the tapered connection surfaces 37*a* and 37*b*, so as to achieve the operation of fastening the screw.

Driver Bit (2)

Figure 5:
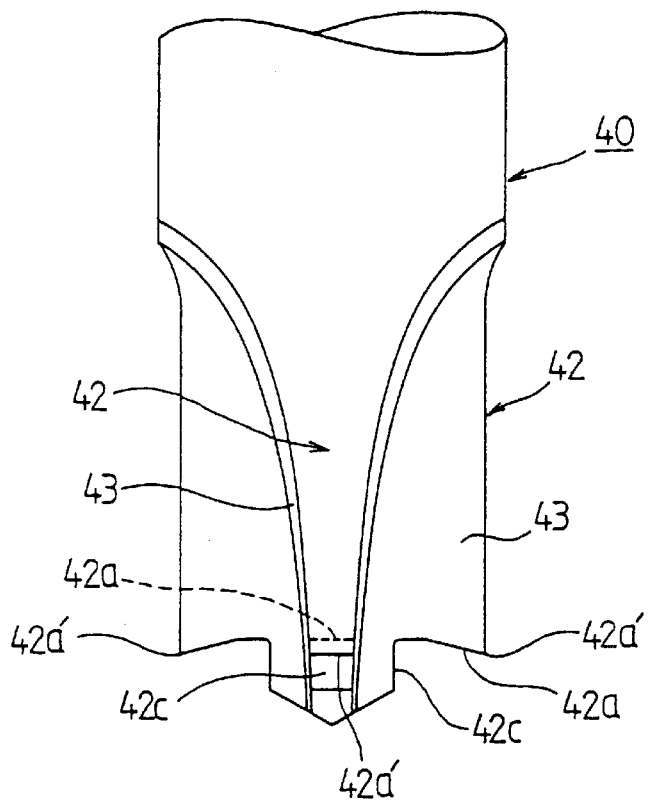
FIG. 5 is a side view of a principal portion showing a variation of the driver bit shown in FIG. 4.

FIG. 5 shows a variation of the driver bit 40 shown in FIG. 4. At each end edge portion 42*a*' of the blade 42 of the driver bit 40 of the above-mentioned example, the edge portion crossing the horizontal surface portion 42*a* of the blade tip, in this variation, forms an acute-angled edge that defines an inclined surface protruding from the horizontal surface portion 42*a* side, and the protrusion 42*b* is formed as a vertical protrusion 42*c* protruding downward. Namely, the driver bit 40 of this example has the vertical protrusion 42*c*, which is formed not to perform tapered contact with the inclined groove portion 32*c* of the bit fitting groove 32 of the screw 30 explained in the above-mentioned example. Thus, the driver bit 40 ensures the prevention of the come-out phenomenon.

Drive Bit (3)

Figure 6:
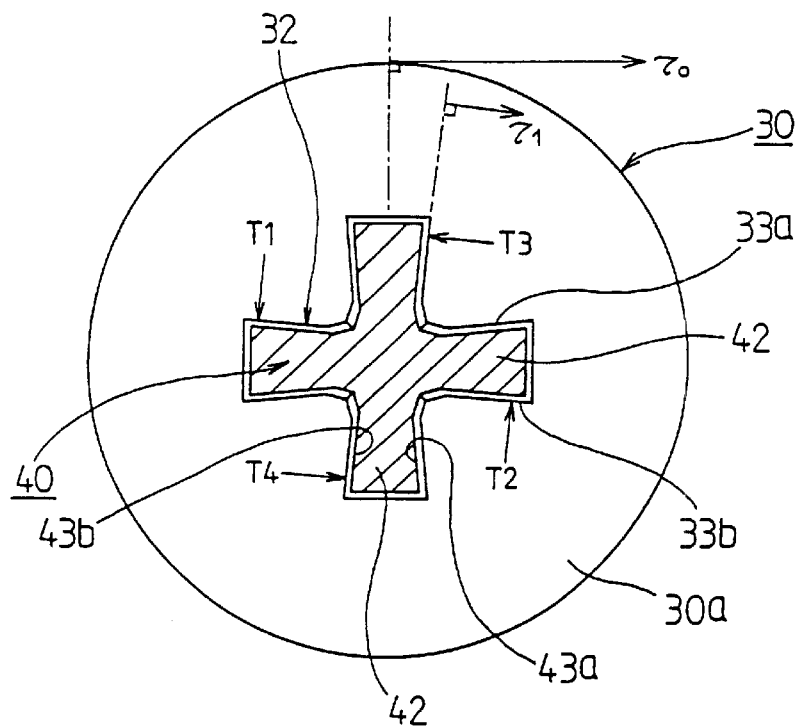
FIG. 6 is an explanatory cross section of a principal portion showing a connected state of a driver bit with the screw shown in FIG. 3.

FIG. 6 shows an example of the driver bit 40 adapted to the screw, especially the screw 30 of the example shown in FIG. 3. Basic configuration of the driver bit 40 is the same as the example shown in FIG. 4 or 5. In this case, the driver bit 40 is adapted to the screw having the bit fitting groove 32 formed as the grooves 33*a* and 33*b* whose width is enlarged little by little. The side wall potions 43 at the tip of the flat blade 42 are formed as side wall portions 43*a* and 43*b* having width widened little by little, which are adapted to the grooves 33*a* and 33*b* whose width is enlarged little by little. Therefore, when the blade 42 of the driver bit 40 abuts the side wall portions of the bit fitting groove 32 of the screw 30, clearance between the grooves 33*a*, 33*b* and the side wall portions 43*a*, 43*b* can be minimized so that a proper engagement of the bit with the screw can be achieved.

In addition, according to this example, upon fastening the screw, torque transmission with balance can be achieved, since the opening angle β between the opposing side wall portions of the neighboring grooves is set a little smaller than 90 degrees as shown in FIG. 3 when the bit fitting groove 32 of the screw 30 having the grooves 33*a* and 33*b* whose width is enlarged little by little abuts the side wall portions (T1, T2, T3 and T4). Further in this case, the torque τ1 applied to the side wall portions (T1, T2, T3 and T4) can be directed to the screw neck portion side than a tangent direction τ0 of the screw head 30*a* to which the blade 42 of the driver bit 40 act. Thus, the com-out phenomenon can be prevented efficiently. This is also true when the driver bit 40 shown in FIG. 4 and 5 or the conventional driver bit 20 shown in FIG. 31 is used.

Combination of a Screw and a Driver Bit (1)

Figure 7:
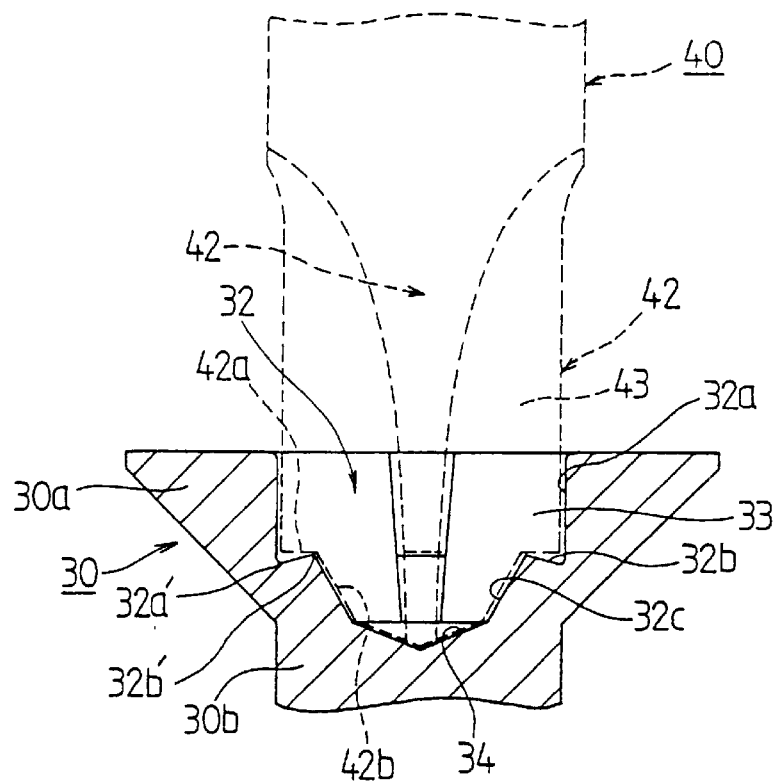
FIG. 7 is a cross section of a side view of a principal portion showing a connected state of the screw shown in FIG. 1 with the driver bit shown in FIG. 4.

FIG. 7 shows operation of engagement of the screw 30 mentioned above (see FIG. 1) and the driver bit 40 (see FIG. 3). According to this example, the horizontal surface 42*a* and the protrusion 42*b* formed of the flat blade 42 of the driver bit 40 fit in the non-planar bottom portions 32*b* and the inclined groove portions 32*c* of the bit fitting groove 32 of the screw 30. The side wall portions 43 of the blades 42 and the protrusion 42*b* abut the side wall portions 33 of the bit fitting groove 32 of the screw 30. Thus, a desired torque can be transmitted to the screw 30 by rotating the driver bit 40.

Especially, according to the present example, since the non-planar bottom portions 32*b* is formed in the bit fitting groove 32 of the screw 30, the contact area of the side wall portions 33 contacting the side wall portion 43 of the flat blade 42 of the driver bit 40 can be enlarged upon engagement with the driver bit 40. In addition, the tapered contact area of the protrusion 42*b* of the driver bit 40 abutting the inclined groove portions 32*c* of the bit fitting groove 32 of the screw 30 is partial and small. Therefore, the come-out phenomenon that occurs in the conventional combination of screw and driver bit can be securely prevented.

Combination of a Screw and a Driver Bit (2)

Figure 8:
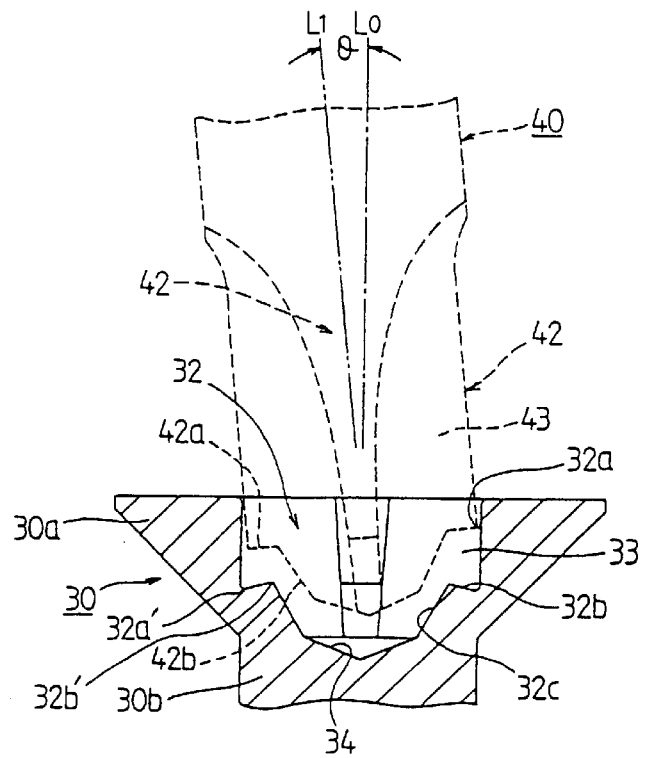
FIG. 8 is a cross section of a side view of a principal portion showing a variation of a connection state of the screw shown in FIG. 1 with the driver bit shown in FIG. 4.

FIG. 8 shows a variation of the engagement operation of the screw 30 shown in FIG. 7 and the driver bit 40. In this example, the flat blade 42 of the driver bit 40 (bit axis $L_1$) is engaged with the bit fitting groove 32 of the screw head 30*a* at a predetermined slant angle θ with respect to the screw axis $L_0$. Also in this combination of the screw 30 and the driver bit 40, accordance with the present invention, a predetermined torque is transmitted to the screw 30 when the driver bit 40 is rotated in the same way as the above-mentioned example. In this case, an allowable angle θ between the screw axis $L_0$ and the bit axis $L_1$ is preferably less than about 15 degrees.

Screw (3)

Figure 9:
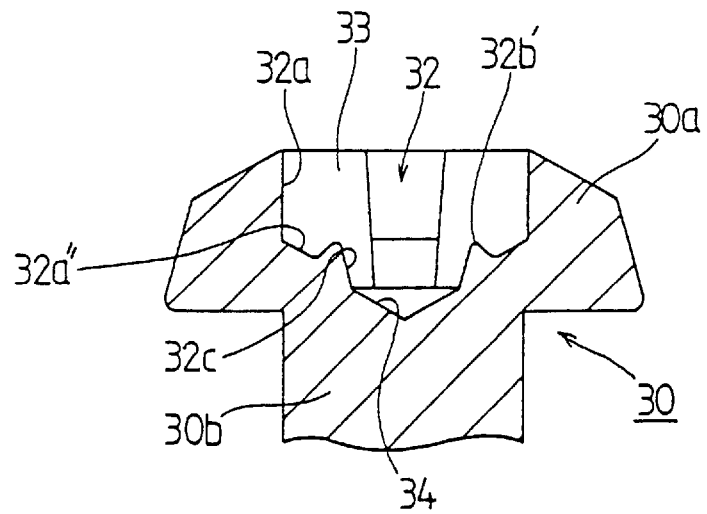
FIG. 9 is a cross section of a side view of a principal portion showing another example of a screw according to the present invention.

FIG. 9 shows another example of the screw according to the present invention. For easiness of the explanation, the same portion as the screw shown in FIG. 1 is denoted by the same reference numeral, and the detail explanation of the element is omitted. In this example, the present invention is applied to a screw with a pan-shaped screw head 30*a* instead of the plate-shaped screw head 30*a* shown in FIG. 1. The screw 30 of the present example has a lower edge portion of the vertical end wall portion 32*a* formed at the end edge portion of the bit fitting groove 32. The lower edge portion is shallower than the example shown in FIG. 1. An inclined portion 32*a*'' is formed inclining downward at first from the lower edge portion toward the center of the screw head 30*a*. Then, the upward raised portion 32*b*' is formed. Other configuration is basically the same as the screw shown in FIG. 1.

By using the screw 30 of this example too, a proper screw fastening operation can be performed without the come-out phenomenon in the combination with the driver bit 40 of the above-mentioned example.

Screw (4)

Figure 10:
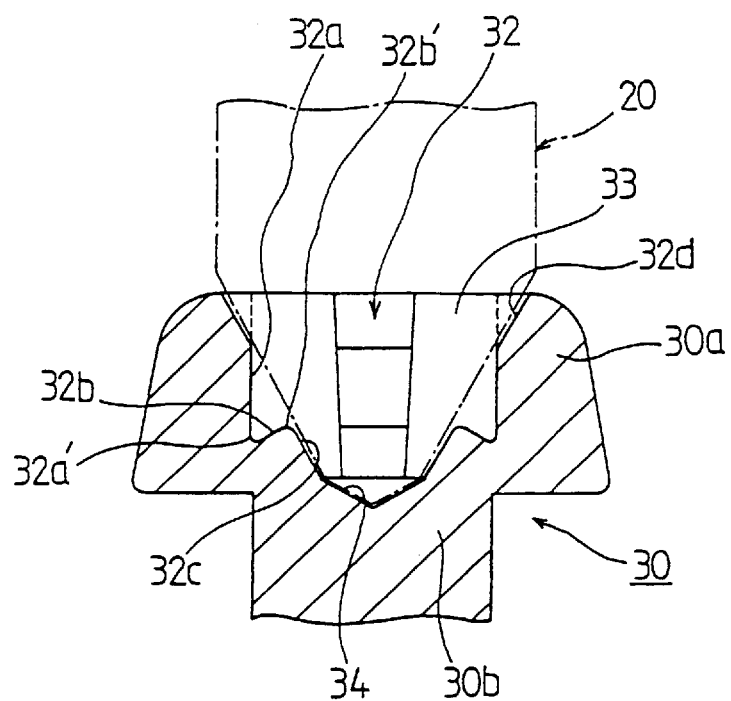
FIG. 10 is a cross section of a side view of a principal portion showing still another example of a screw according to the present invention.

FIG. 10 shows still another example of the screw according to the present invention. In this example too, the same portion as the screw shown in FIG. 1 is denoted by the same reference numeral, and the detail explanation of the element is omitted for easiness of the explanation. The screw 30 of the present example, similarly to the example shown in FIG. 9, is the one having a pan-shaped screw head 30*a* to which the present invention is applied. The upper edge portion of the vertical end wall portion 32 a formed at the end edge portion of the bit fitting groove 32 is opened with a predetermined taper 32*d*. Other configuration is basically the same as the screw shown in FIG. 1.

According to the above-mentioned configuration, even if a driver bit 20 shown in FIG. 31, for example, for the conventional screw with a cross groove is used, the blade of the driver bit 20 is properly engaged with the tapered portion 32*d* of the upper edge portion of the vertical end wall portion 32*a*, and also engaged properly with the bit fitting groove 32 of the screw 30 of this example.

Header Punch (1)

Figure 11:
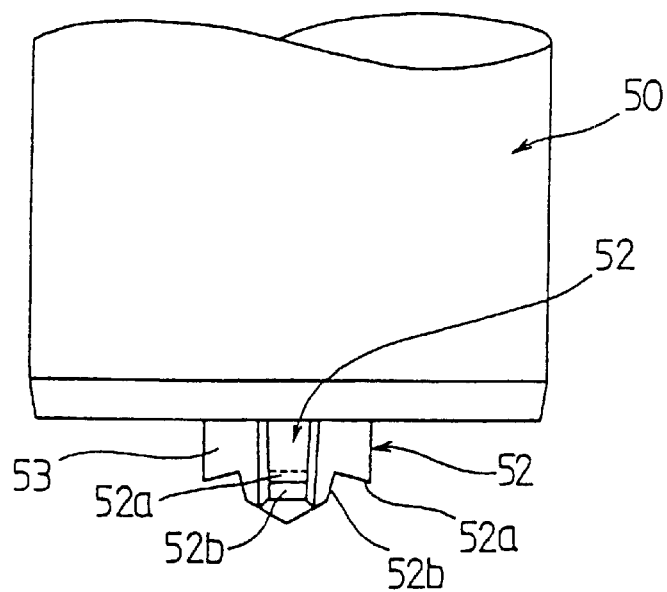
FIG. 11 is a cross section of a principal portion showing a header punch for manufacture of screws used for forming the screw head shown in FIG. 1.

FIG. 11 shows an example of the header punch 50 for manufacture of the screw 30 of the example shown in FIG. 1. The header punch 50 of this example is used for punching the bit fitting groove 32 in the screw head 30*a* of the screw 30 shown in FIG. 1. The header punch 50 of this example has protrusions 52 with protruding edge portions 52*a* for forming the vertical end wall portions 32*a* and the bottom portions 32*b* at the end edge portion of the bit fitting groove 32 of the screw head 30*a*, and an inclined protrusion line 52*b* for forming the inclined groove portions 32*c* extending from the protrusions 52 toward the center of the screw neck 30*b*.

Header Punch (2)

The header punch for manufacture of the screw 30 of the example shown in FIG. 3 is structured by making the side wall portions 53 of the protrusion 52 of the header punch shown in FIG. 11 for forming the grooves 33*a* and 33*b* of the bit fitting groove whose width is enlarged little by little such that the width is enlarged little by little from the center of the protrusion 52 to the outer portion in the radial direction in the configuration of the header punch 50 shown in FIG. 11. Thus, the header punch can easily manufacture the screws 30 of the example shown in FIG. 3.

Header Punch (3)

Figure 12:
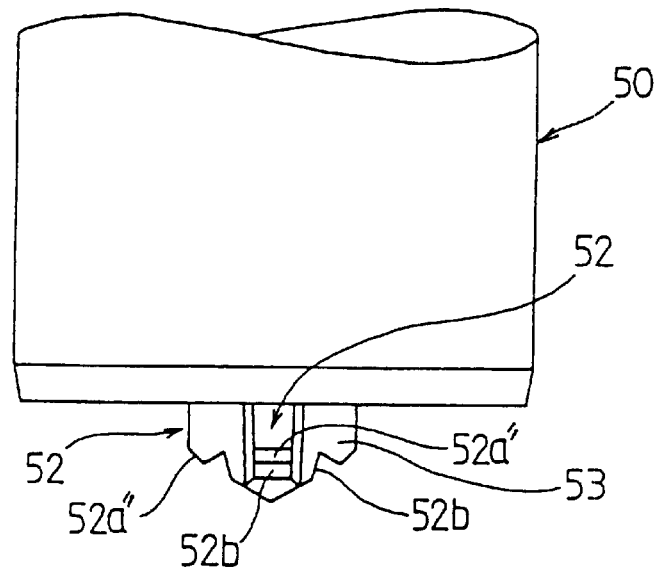
FIG. 12 is a side view of a principal portion showing a header punch for manufacture of screws used for forming the screw head shown in FIG. 9.

FIG. 12 shows an example of the header punch for manufacture of the screw 30 of the example shown in FIG. 9. For easiness of the explanation, the same portion as the header punch shown in FIG. 11 is denoted by the same reference numeral, and the detail explanation of the element is omitted. The header punch 50 of this example has protrusions 52 with protruding edge portions 52*a"* for forming the vertical end edge portions 32*a* and the non-planar bottom portions 32*b* at the end edge portion of the bit fitting groove 32 of the screw head 30*a*, and an inclined protrusion line 52*b* for forming the inclined groove portions 32*c* extending toward the center of the screw neck 30*b* by the protrusions 52.

Second Example

Next, a combination of a plus-and-minus screw and a driver bit as well as a header punch for manufacture of the screw of a second example according to the present invention will be explained in detail with reference to the attached drawings.

[Plus-an] Plus-and-minus Screw (1)

Figure 13:
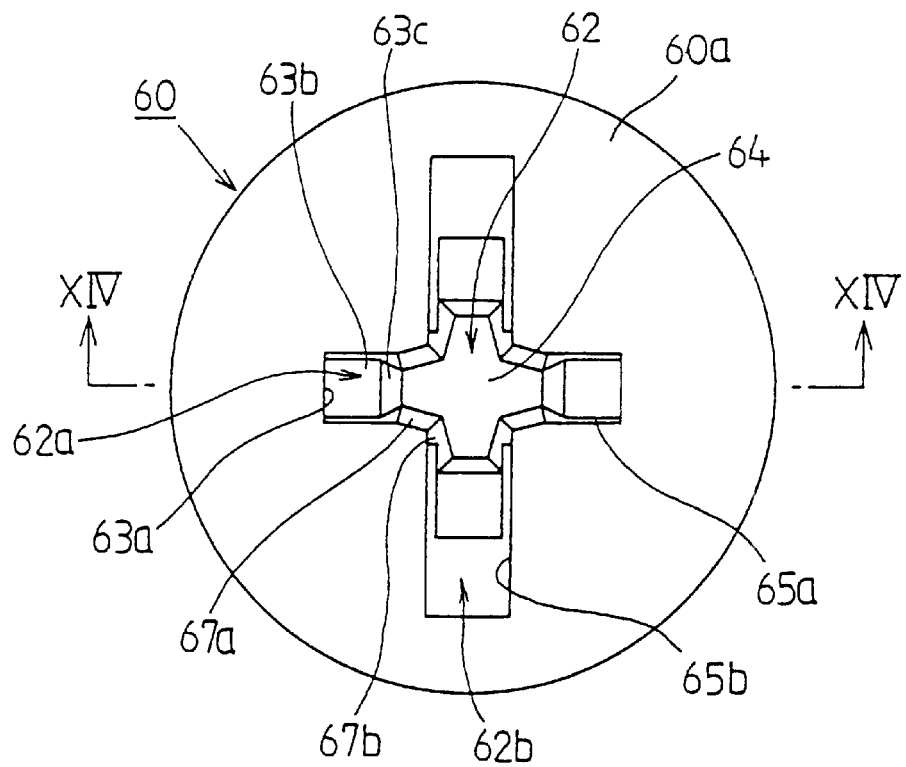
FIG. 13 is a top view of a screw head showing an example of a plus-and-minus screw according to the present invention.
Figure 14:
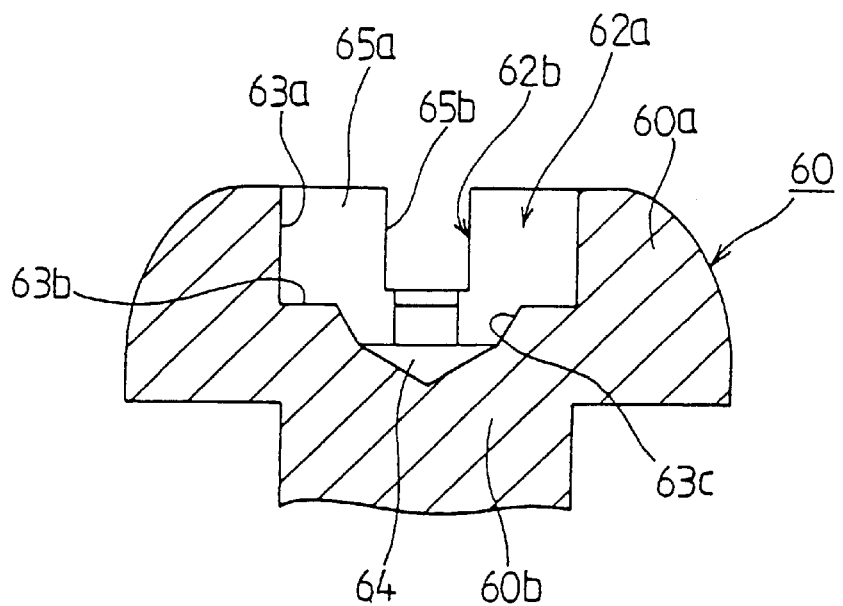
FIG. 14 is a cross section of a side view of a principal portion along the XIV—XIV line of the plus-and-minus screw shown in FIG. 13.

FIGS. 13 and 14 show an example of a plus-and-minus screw according to the present invention. In FIGS. 13 and 14, reference numeral 60 denotes the plus-and-minus screw according to the present invention. The screw head 60*a* of the plus-and-minus screw 60 is provided with a bit fitting groove 62. This bit fitting groove 62 consists of a pair of linear grooves 62*a* and 62*b* that cross each other like a plus (+) mark at the center of the screw head 60*a*.

In the bit fitting groove 62 of this example, one of the linear grooves 62*a* forms a vertical end wall portion 63*a* having a predetermined depth at the end edge portion of the groove, a groove bottom portion 63*b* extending from a lower edge portion 63*a'* of the end wall portion 63*a* toward the center of the screw head 60*a* forms a horizontal bottom portion, and an inclined groove portion 63*c* is formed from the horizontal bottom portion (63*b*) toward the center of the screw neck 60*b*. The center bottom portion is provided with a substantially conical-shaped bottom surface 64. A substantially vertical side wall portion 65*a* having an angle of 1.5–2.0 degrees as an appropriate draft (for draught of a header punch) formed at each side of the linear groove 62*a*. This side wall portion 65*a* abuts and engage a side wall portion of a Phillips® screwdriver bit mentioned below.

The other linear groove 62*b* is formed and extended as a horizontal groove (62*b*) having an adequate width and depth for abutting and engaging the blade of a flat-blade screwdriver bit. In the same way as the above-mentioned linear groove 62*a*, a substantially vertical side wall portion 65*b* having an angle of 1.5–2.0 degrees as an appropriate draft (for draught of a header punch) formed at each side of the horizontal groove (62*b*). The side wall portion 65*b* abuts and engages the blade of the known flat-blade screwdriver bit.

Figure 34:
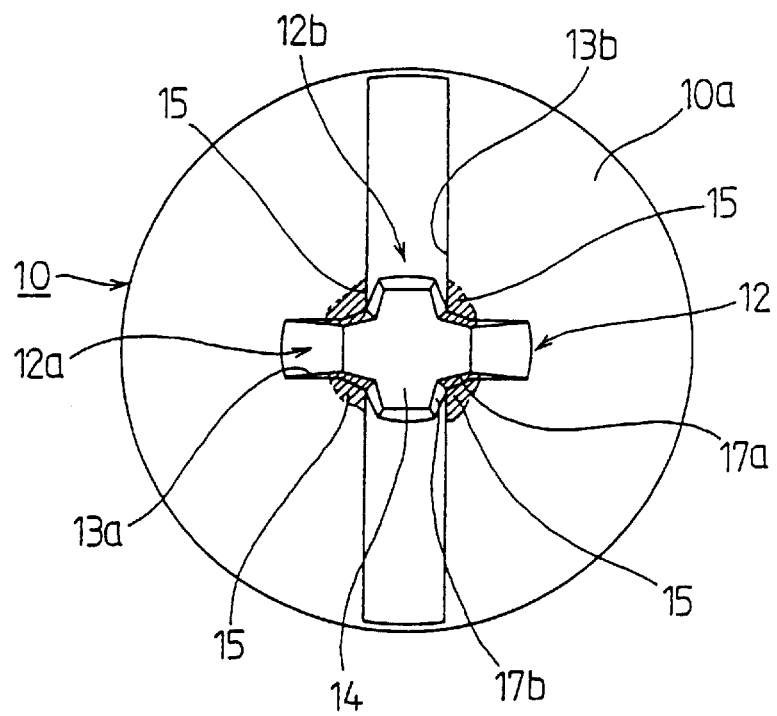
FIG. 34 is a top view of the plus-and-minus screw shown in FIG. 33.

Corner portions between the linear groove 62*a* and the neighboring linear groove (the horizontal groove) 62 is provided with taper connection surfaces 67*a* and 67*b* in the same way as in the conventional plus-and-minus screw shown in FIG. 34.

As mentioned above, the plus-and-minus screw 60 of this example has the vertical end wall portion 63*a* at the end edge portion of the one linear groove 62*a* and groove bottom portion 63*b* formed as a horizontal bottom portion 63*b*. The inclined groove portions 63*c* are formed extending from the horizontal bottom portions 63*b* toward the center of the screw neck 60*b*. Thus, the tapered contact area of the entire bit fitting groove 62 is partial and small. In addition, the area of the side wall portion 65*a* of the one linear groove 62*a* of the opposing bit fitting groove 62 to which a tip of a drive bit abuts (the area of the driving surface that the driver bit apply a rotation drive force to the screw) can be enlarged.

In addition, the groove width of the one linear groove 62*a* is adapted to the thickness of the blade of the driver bit mentioned below and is preferably a little wider than the thickness in consideration of the plating or coating on the surface of the screw.

[Plus-an] Plus-and-minus Screw (2)

Figure 15:
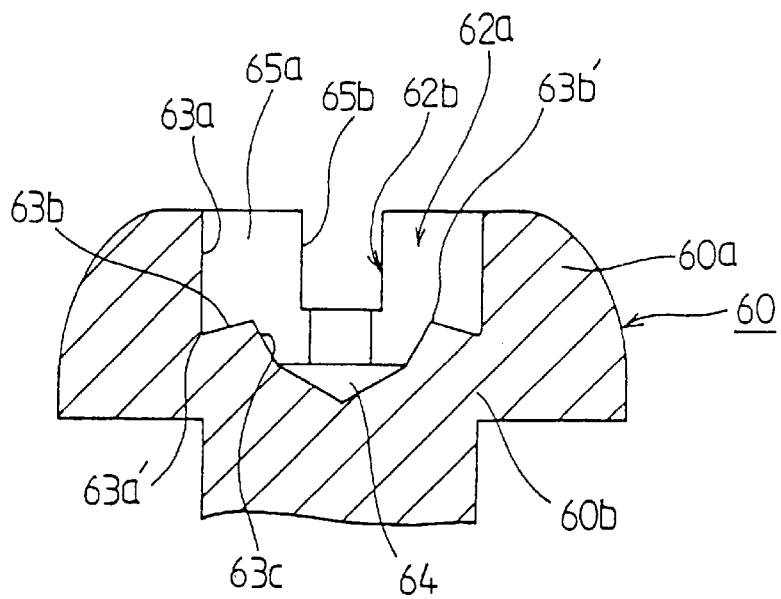
FIG. 15 is a cross section of a side view of a principal portion showing a variation of the plus-and-minus screw shown in FIG. 14

FIG. 15 shows a variation of the plus-and-minus screw 60 shown in FIGS. 13 and 14. In this example, the groove bottom portion 63*b* of one linear groove 62*a* of the bit fitting groove 62 has a non-planar bottom portions (63*b*) raised from the lower edge portion 63*a'* of the vertical end wall portion 63*a* having a predetermined depth formed at the end edge portion toward the center portion of the screw head portion 60*a* and an inclined groove portions 63*c* extending from the non-planar bottom portions 63*b* toward the center portion of the screw neck portion 60*b* so that the center bottom portion is formed as a substantially conical-shaped bottom surface 64 having a mild slope. Other configuration is the same as the plus-and-minus screw 60 of the example mentioned above.

The plus-and-minus screw 60 of this example, in the same way as the above-mentioned example, makes the tapered contact area of the entire bit fitting groove 62 partial and small. In addition, the contact area of the side wall portions 65*a* of the one linear groove 62*a* of the opposing bit fitting groove 62 to which the tip of the driver bit abuts can be enlarged.

[Plus-an] Plus-and-minus Screw (3)

Figure 16:
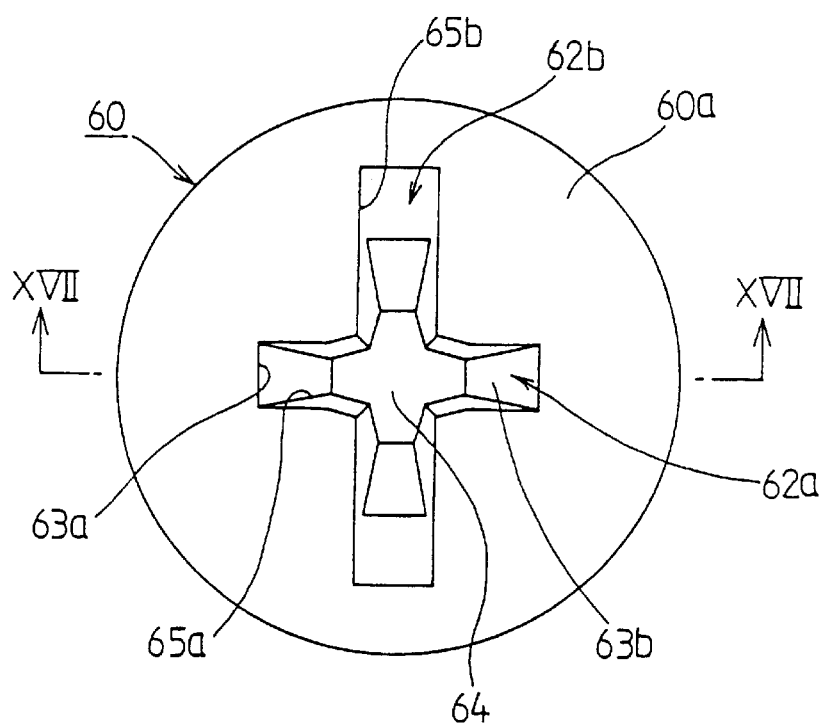
FIG. 16 is a top view of a screw head showing another example of a plus-and-minus screw according to the present invention.
Figure 17:
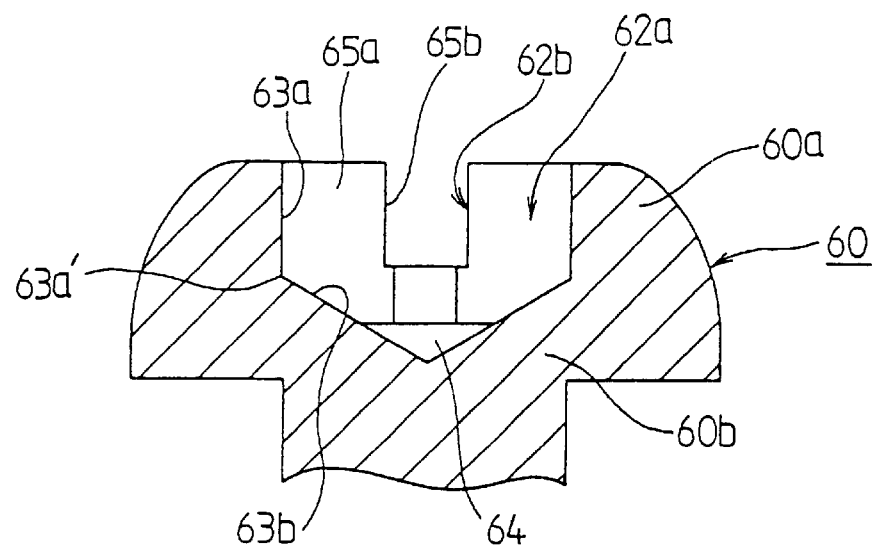
FIG. 17 is a cross section of a side view of a principal portion along the XVII—XVII line of the plus-and-minus screw shown in FIG. 16.

FIGS. 16 and 17 show still another example of the plus-and-minus screw 60 according to the present invention. In this example, the groove bottom portion 63*b* of one linear groove 62*a* of the bit fitting groove 62 has an inclined groove portion (63*b*) inclined from the lower edge portion 63*a'* of the vertical end wall portion 63*a* having a predetermined depth formed at the end edge portion toward the center portion of the screw head portion 60*a*, so that the center bottom portion is formed as a substantially conical-shaped bottom surface 64 having a mild slope.

Other configuration is the same as the plus-and-minus screw 60 of the example mentioned above. The plus-and-minus screw 60 of this example, in the same way as the above-mentioned example, makes the tapered contact area of the entire bit fitting groove 62 partial and small. In addition, the contact area of the side wall portions 65*a* of the one linear groove 62*a* of the opposing bit fitting groove 62 to which the tip of the driver bit abuts can be enlarged.

[Plus-an] Plus-and-minus Screw (4)

Figure 18:
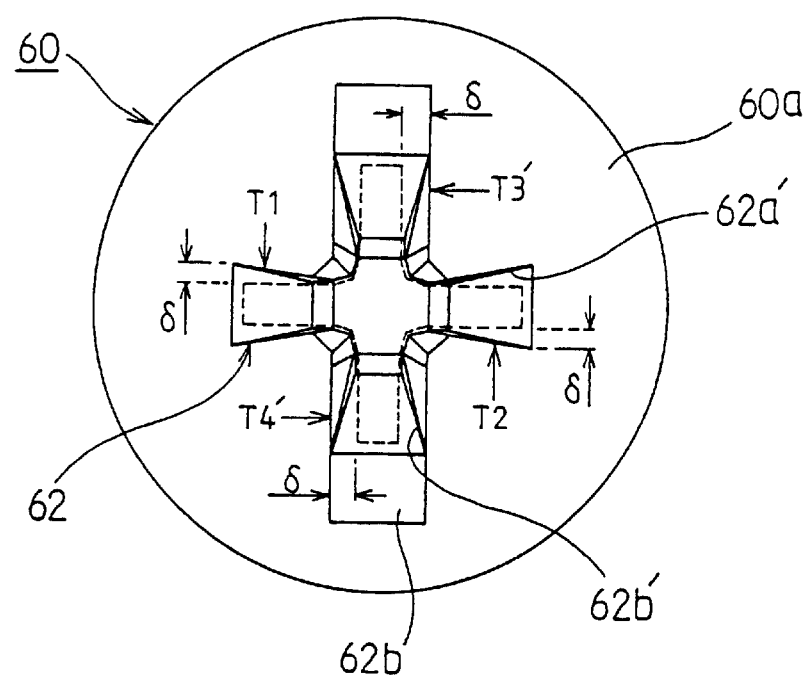
FIG. 18 is a top view of a screw head showing still another example of a plus-and-minus screw according to the present invention.

FIG. 18 shows still another example of the plus-and-minus screw 60 according to the present invention. In this example, the one linear groove 62*a* and the other linear groove 62*b* of the plus-and-minus screw 60 are formed as grooves 62*a*' and 62*b*' whose groove width are substantially widened little by little from the center portion of the screw head 60*a* to the outer portion in the radial direction.

In the plus-and-minus screw 60 of this example having the above-mentioned configuration, equal clearances δ are formed as shown in the figure when the blade (illustrated by the broken line) of the driver bit abuts the side walls of the bit fitting groove 62 of the plus-and-minus screw 60, since the above-mentioned groove 62*a*' and 62*b*' whose width is enlarged little by little are formed. Therefore, the blade of the driver bit can abut the side wall portions (T1 and T2) of the one groove 62*a*' and the side wall portions (T3' and T4') of the other groove 62*b*' simultaneously, so that a balanced torque transmission can be achieved.

Furthermore, in the same way as the screw 30 of the example mentioned above with reference to FIG. 3, the plus-and-minus screw 60 of this example also can prevent the come-out phenomenon from the bit fitting groove 62 of the plus-and-minus screw 60 in the combination with a driver bit mentioned below by setting the opening angle β of the opposing side wall portions of the neighboring grooves a little smaller than 90 degrees.

Driver Bit (1)

Figure 19:
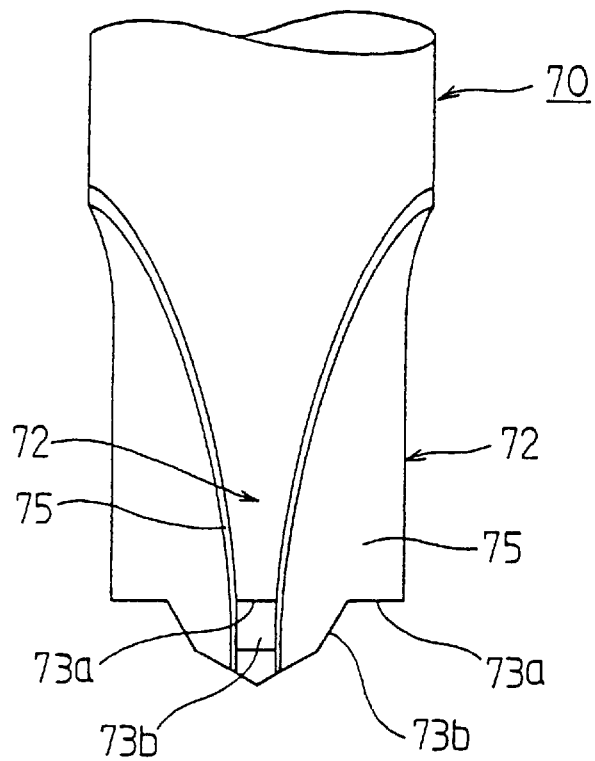
FIG. 19 is a side view of a principal portion showing an example of a driver bit adapted to a plus-and-minus screw according to the present invention.

FIG. 19 shows an example of a driver bit 70 adapted to the screw 60 of the example explained with reference to FIGS. 13 to 18. The driver bit 70 of the present example has a flat blades 72 that engage the bit fitting grooves 62 of the screw 60, and have horizontal surfaces 73*a* extending substantially perpendicularly to engage the vertical end wall portions 63*a* and the non-planar bottom portions 63*b* formed at the end edge portions of the one linear groove 62*a* of the bit fitting grooves 62. The driver bit 70 also has a protrusions 73*b* adapted to the contour of the inclined groove portions 63*c* extending from the groove bottom portions 63*b* of the linear groove 62*a* toward the center of the screw neck 60*b*.

Reference numeral 75 denotes a substantially vertical side wall portions with a permitted little taper formed at both side surfaces of the flat blades 72 or the horizontal surface portions 73*a*. These side wall portions 75 abut and engage the side wall portions 65*a* formed at the one linear groove 62*a* of the bit fitting grooves 62 of the plus-and-minus screw 60 of the above-mentioned example.

Therefore, engagement of these driving surfaces can provide sufficient engaging area, so that the come-out phenomenon that occurs in the combination of the conventional plus-and-minus screw and driver bit can be prevented effectively.

Furthermore, the screw 60 of the above-mentioned example has the tapered connection surfaces 67*a* and 67*b* formed at the neighboring corner portions of the linear grooves 62*a* and 62*b* of the bit fitting groove 62 in the same way as the conventional plus-and-minus screw 60. Therefore, even if the conventional driver bit as shown in FIG. 31 is used, for example, a part of the blade of the drive bit abuts and engages the tapered connection surfaces 67*a* and 67*b*, so as to achieve the operation of fastening the screw.

Driver Bit (2)

Figure 20:
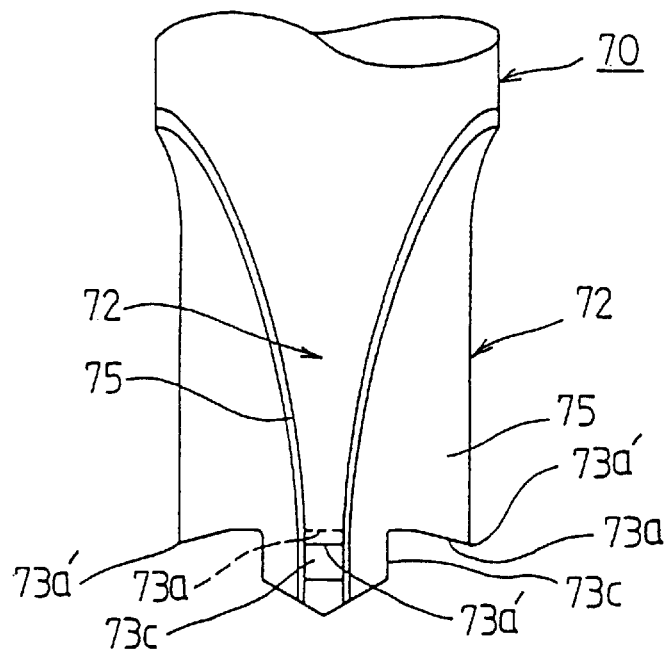
FIG. 20 is a side view of a principal portion showing a variation of the driver bit shown in FIG. 19.

FIG. 20 shows a variation of the driver bit 70 shown in FIG. 19. At each end edge portion 73*a*' of the flat blade 72 of the driver bit 70 of the above-mentioned example, the edge portion crossing the horizontal surface portion 73*a* of the blade tip is formed in acute angle protruding in the horizontal surface portion 73*a* side, and the protrusion 73*b* is formed as a vertical protrusion 73*c* protruding downward. Namely, the driver bit 70 of this example has the vertical protrusion 73*c*, which is formed not to perform tapered contact with the inclined groove portion 63*c* of the one linear groove 62*a* of the plus-and-minus screw 60 explained in the above-mentioned example. Thus, the driver bit 70 having the above-mentioned configuration ensures the prevention of the come-out phenomenon.

Combination of a Plus-and-minus Screw and a Driver Bit (1)

Figure 21:
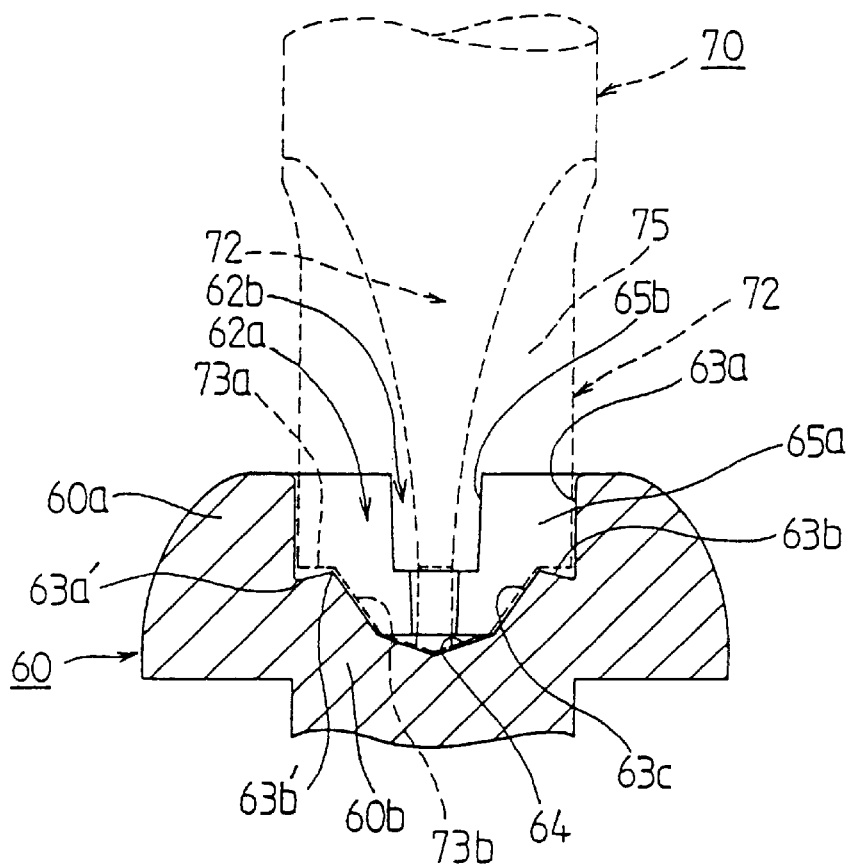
FIG. 21 is a cross section of a side view of a principal portion showing a connection state of the plus-and-minus screw shown in FIG. 15 and the driver bit shown in FIG. 19.
Figure 22:
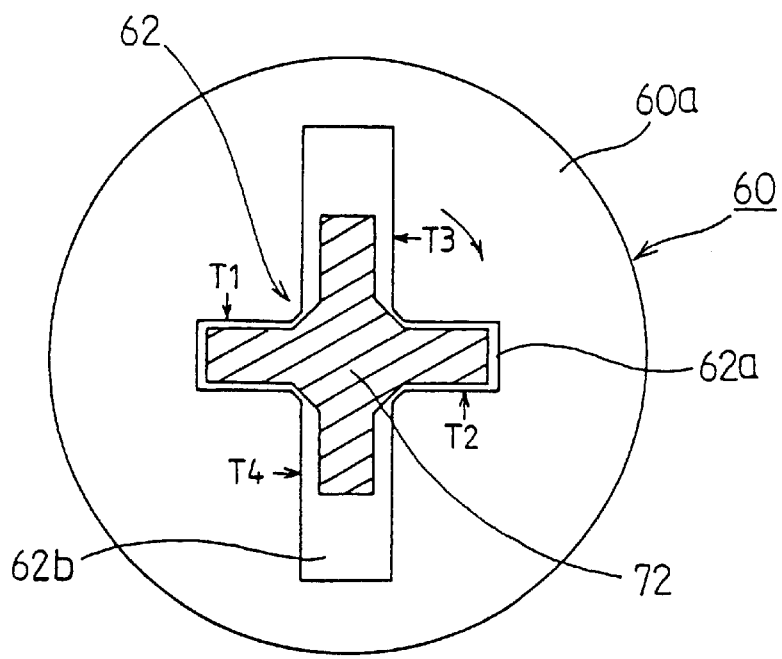
FIG. 22 is an explanatory top view of a screw head showing a connection state of the driver bit shown in FIG. 19 at the screw head of the plus-and-minus screw shown in FIG. 13.

FIG. 21 shows operation of engagement of the plus-and-minus screw 60 of the above-mentioned example (see FIG. 15) and the driver bit 70 (see FIG. 19). According to this example, the horizontal surface 73*a* and the protrusion 73*b* formed of the flat blade 72 of the driver bit 70 fit in the groove bottom portions 63*b* and the inclined groove portions 63*c* of the one linear groove 62*a* of the plus-and-minus screw 60, so that the side wall portions 75 of the blades 72 and the protrusion 73*b* can abut the side wall portions 65*a* of the one linear groove 62*a* of the plus-and-minus screw 60 (see FIG. 22). Therefore, a desired torque can be transmitted to the plus-and-minus screw 60 at the abutting portions (T1 and T2) of the blade 72 of the driver bit 70 with the one linear groove 62*a* of the plus-and-minus screw 60 by rotating the driver bit 70 in the direction of the arrow as shown in FIG. 22. In this case, concerning the relationship of the other linear groove 62*b* of the plus-and-minus screw 60 and the blade 72 of the driver bit 70, the blade 72 cannot abut the side wall portions 65*b* (T3 and T4) of the other linear groove 62*b* (see FIG. 22).

Especially, according to the present example, in the case where the non-planar bottom portions 63*b* is formed in the one linear groove 62*a* of the bit fitting groove 62 of the screw 60, the contact area of the side wall portions 65*a* contacting the side wall portion 75 of the flat blade 72 of the driver bit 70 can be enlarged upon engagement with the driver bit 70. In addition, the tapered contact area of the protrusion 73*b* of the driver bit 70 abutting the inclined groove portions 63*c* of the one linear groove 62*a* of the plus-and-minus screw 60 is partial and small. Therefore, the come-out phenomenon that occurs in the conventional combination of plus-and-minus screw and driver bit can be securely prevented (see FIG. 21).

Combination of a Plus-and-minus Screw and a Driver Bit (2)

Figure 23:
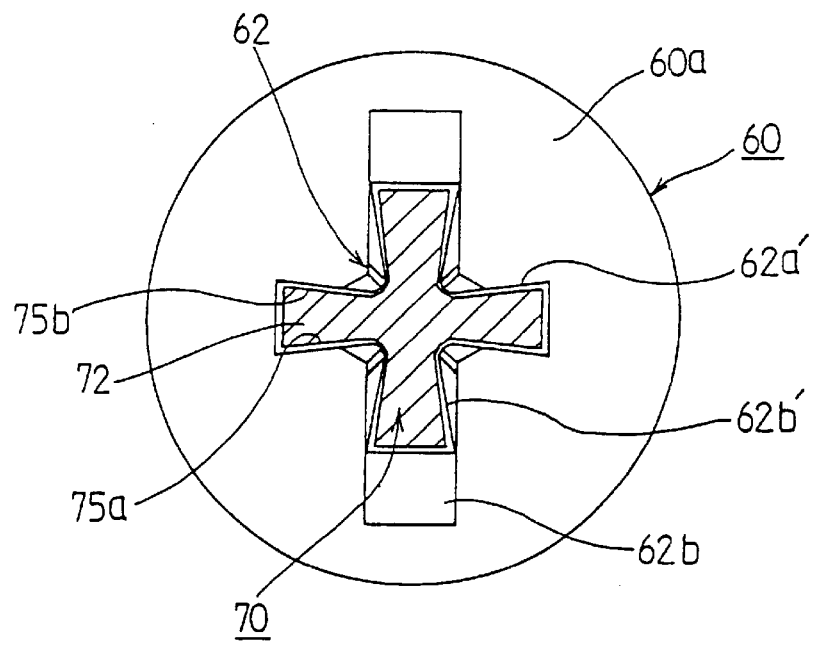
FIG. 23 is an explanatory plane view of a principal portion showing a connection state with the driver bit adapted to the plus-and-minus screw shown in FIG. 18.

FIG. 23 shows an engagement operation of the driver bit 70 adapted to the plus-and-minus screw 60 especially shown in FIG. 18. In this example, the driver bit 70 used for the plus-and-minus screw 60 having the bit fitting groove 62 formed as grooves 62*a*' and 62*b*' whose width is substantially enlarged little by little, has side wall portions 75 at the tip of the flat blade 72. The side wall portions 75 is formed as side wall portions 75*a* and 75*b* whose width is enlarged little by little to as to be adapted to the grooves 62*a*' and 62*b*' whose width is enlarged little by little. Thus, a clearance between the grooves 62*a*', 62*b*' and the side wall portions 75*a*, 75*b* can be minimized when the blade 72 of the driver bit 70 abuts the side wall portions of the bit fitting grooves 62 of the plus-and-minus screw 60, so that a proper engagement of the bit with the plus-and-minus screw can be achieved.

In addition, in the same way as the screw 30 of the example explained above with reference to FIG. 6, the torque τ1 applied to the side wall portions of the bit fitting groove 62 of the plus-and-minus screw 60 can be directed to the screw neck portion side than a tangent direction τ0 of the screw head 60a to which the blade 72 of the driver bit 70 act. Thus, the com-out phenomenon can be prevented efficiently.

Header Punch (1)

A header punch for manufacture of the plus-and-minus screw 60 of the example explained above with reference to FIGS. 13 and 14, FIGS. 15 and 16, or FIG. 17 can be made similarly to the header punch 50 of the first example explained above (see FIGS. 11 and 12).

Figure 24:
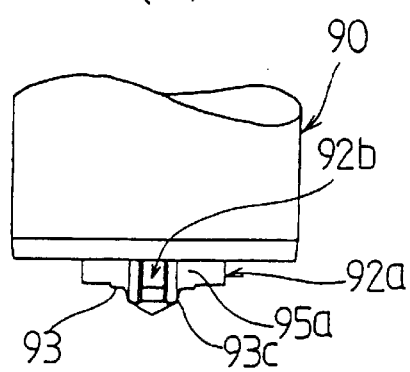
FIGS. 24(a) to 24(c) are a front view of a principal portion, a left side view of a principal portion and a top view of a header punch for manufacture of screws for forming a screw head of the plus-and-minus screw shown in FIG. 13.
Figure 24:
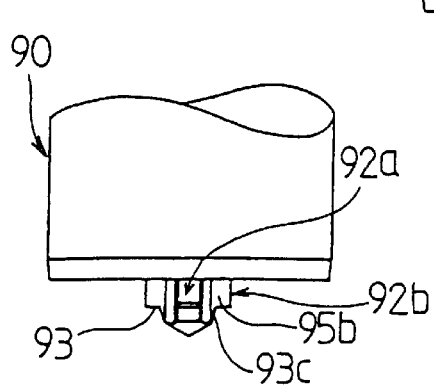
Figure 24:
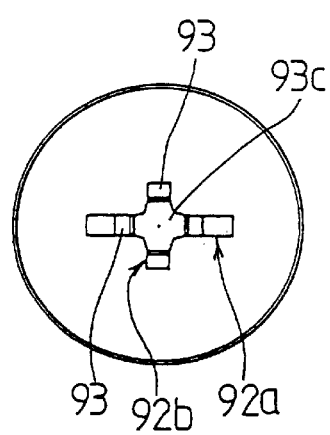

As shown in FIGS. 24(a) to 24(c), the header punch of this example has protrusions 92a and 92b with raised portions 93 for, forming vertical end edge portions 63a and groove bottom portions 63b (horizontal bottom portions, non-planar bottom portions and inclined bottom portions) at the end edge portions of the bit fitting groove 62 of the screw head portion 60a. The protrusions 92a and 92b correspond to the pair of linear grooves 62a and 62b that cross each other. The header punch also has inclined protrusion lines 93c for forming the inclined groove portions 63c extending from the protrusions toward the center portion of the screw neck 60b.

Header Punch (2)

Further more, especially a header punch for manufacture of the plus-and-minus screw 60 of the example shown in FIG. 18 is structured by making the side wall portions (see 95a and 95b of FIG. 24) of the protrusion (see 92a and 92b of FIG. 24) that form the grooves 62a' and 62b' of the bit fitting groove 62 whose width is enlarged little by little in the structure of the header punch 50 for manufacture of the plus-and-minus screw 60 of the above-mentioned example such that the width is enlarged little by little from the center portion of the protrusion toward the outer portion in the radial direction. Thus, the header punch can easily manufacture the plus-and-minus screws 60 of the example shown in FIG. 18.

THIRD EXAMPLE

Further, the driver bit for the plus-and-minus screw as a third example of the present invention will be explained in detail with reference to the attached drawings.

Driver Bit (1)

Figure 25:
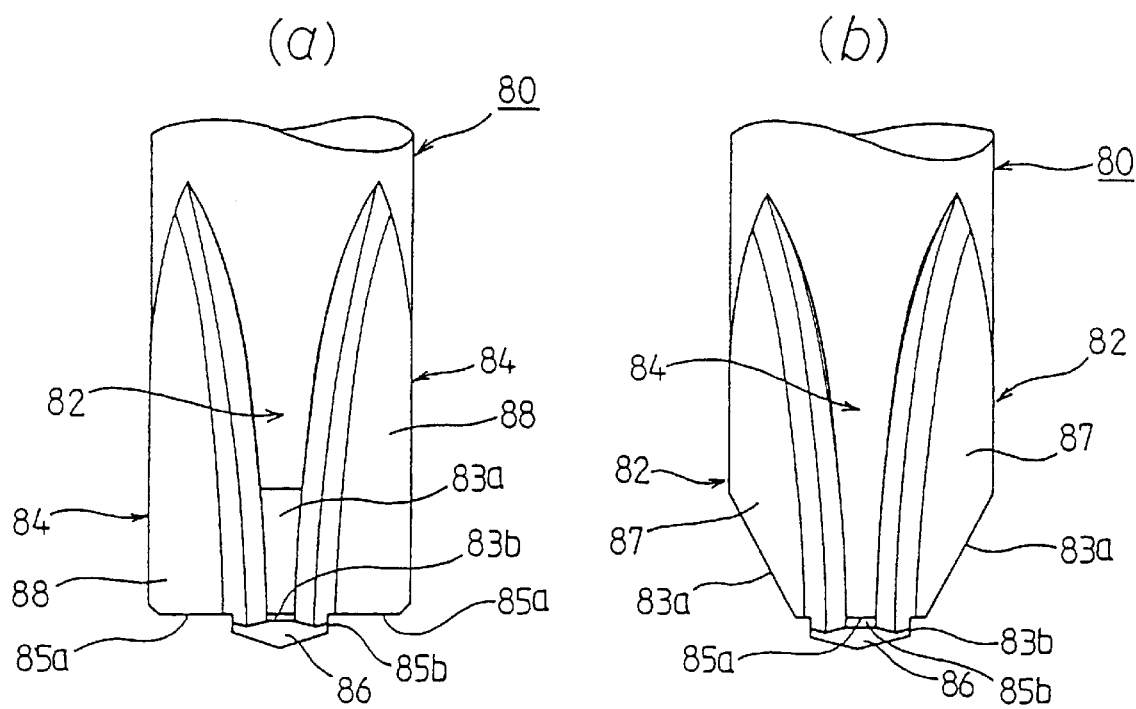
FIGS. 25(a) and 25(b) are a front side view of a principal portion and a left side view of a principal portion showing another example of a driver bit for a plus-and-minus screw according to the present invention.
Figure 33:
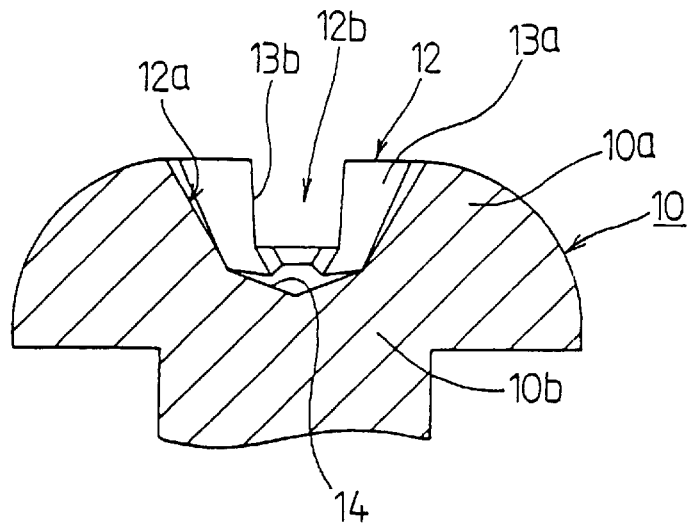
FIG. 33 is a cross section of a side view of a principal portion of a conventional plus-and-minus screw.

FIG. 25 shows an example of a driver bit for the plus-and-minus screw according to the present invention. In FIGS. 25(a) and 25(b), reference numeral 80 denotes a configuration of a principal portion of the driver bit for plus-and-minus screw according to the present invention. The blade tip of the driver bit 80 is adapted to the bit fitting groove 12 or 62 formed by a pair of linear grooves 12a and 12b or 62a and 62b crossing each other at the center portion of the screw head 10a or 60a of the plus-and-minus screw 60 shown in FIGS. 15 to 18, or the conventional plus-and-minus screw 10 shown in FIGS. 33 and 34. The driver bit 80 of the present example has a flat blades 82 that engage the bit fitting grooves 12 or 62 of the screw 10 or 60, and has an inclined end edge portion 83a that engages the inclined groove formed as the one linear groove 12a or 62a, and a flat blade 84 that has a horizontal end edge portion 85a extending substantially perpendicularly to engage the horizontal groove portions formed as the other linear end edge portion 12b or 62b.

In addition, the tip center portion of the flat blades 82 and 84 are provided with a protrusion 86 having vertical surface portions 83b and 85b for fitting in the conical-shaped bottom surface 14 and 64 formed at the center of the screw head 10a or 60a of the plus-and-minus screw 10 or 60. The both side surfaces of the flat blades 82 and 84 are formed as substantially vertical side wall portions 87 and 88 with some taper permitted.

Figure 26:
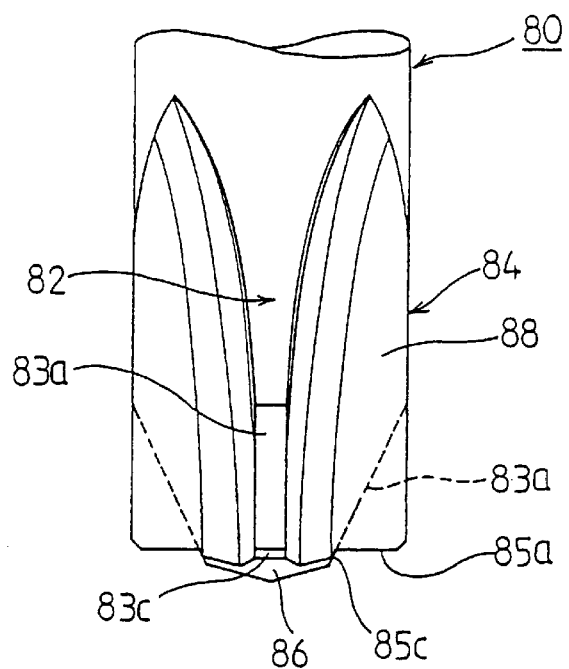
FIG. 26 is a side view of a principal portion showing a variation of the driver bit for a plus-and-minus screw shown in FIG. 25.

The protrusion 86 provided at the tip center portion of the flat blades 82 and 84 can be structured to have inclined surface portions 83c and 85c as shown in FIG. 26.

Combination with a Plus-and-minus Screw (1)

Figure 27:
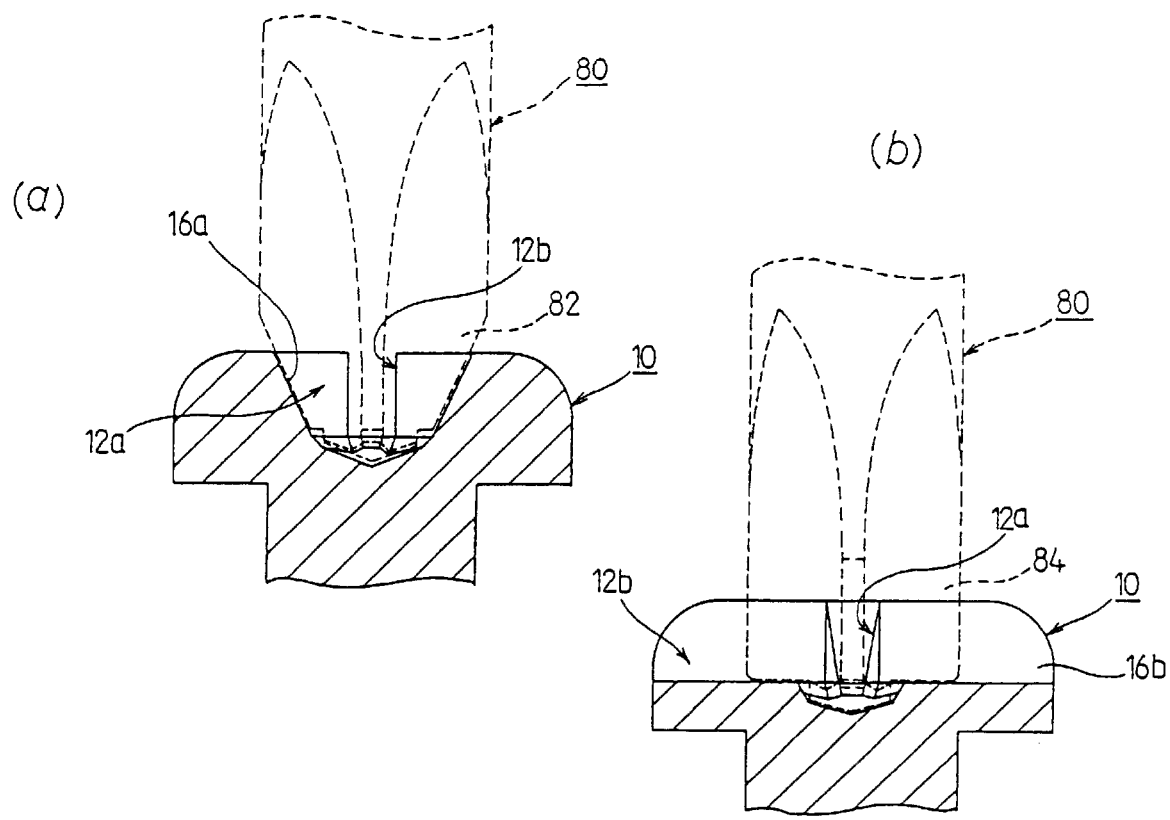
FIGS. 27(a) and 27(b) are cross sections of side views of principal portions showing connection states of the driver bit for a plus-and-minus screw shown in FIG. 25 with the conventional plus-and-minus screws shown in FIGS. 33 and 34, respectively.
Figure 28:
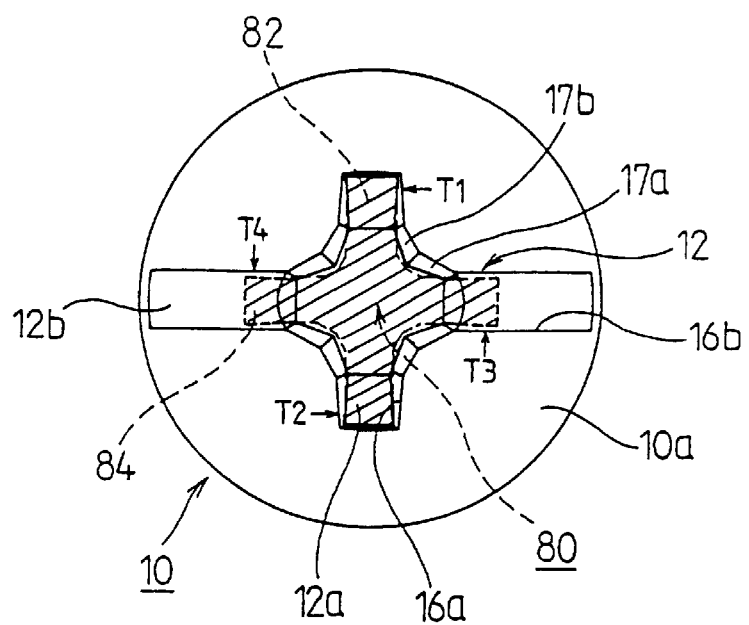
FIG. 28 is an explanatory top view of the screw head showing a connection state of the driver bit for a plus-and-minus screw shown in FIG. 27 and a plus-and-minus screw.
Figure 29:
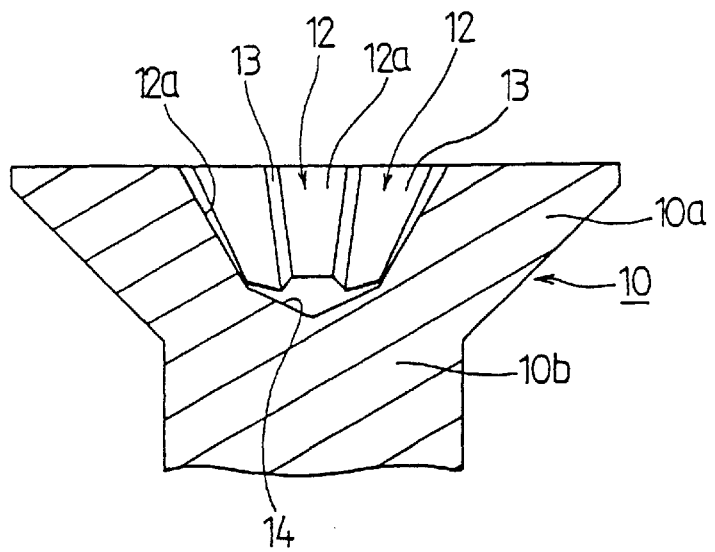
FIG. 29 is a cross section of a side view of a principal portion of a conventional screw having a cross groove.

The driver bit 80 of this example having the above-mentioned configuration, with respect to the plus-and-minus screw 10 shown in FIGS. 28 and 29 or the plus-and-minus screw 60 shown in FIGS. 15–18, concerning the bit fitting groove 12 or 62, as shown in FIGS. 27 and 28, the flat blades 82 and 84 can be engaged with the corresponding grooves 12a and 12b or 62a and 62b.

Namely, for the plus-and-minus screw 10 shown in FIGS. 28 and 29, the one flat blade 82 can be engaged with the inclined groove portion 12a that is the one linear groove of the bit fitting groove 12 properly as shown in FIG. 27(a). In this case, the inclined end edge portion 83a and the protrusion 86 formed on the flat blade 82 of the driver bit 80 fit in the inclined groove 12a of the plus-and-minus screw 10, so that the side wall portion 87 of the flat blade 82 and the protrusion 86 can be abut the side wall portion 16a of the inclined groove portions 12a of the plus-and-minus screw 10. Therefore, a desired torque can be transmitted to the plus-and-minus screw 10 at the abutting portions (T1 and T2) of the blade 82 of the driver bit 80 with the inclined groove 12a of the plus-and-minus screw 10 by rotating the driver bit 80 in the direction of the fastening (see FIG. 28).

In addition, the other flat blade 84, as shown in FIG. 27(b), can be engaged correctly with the horizontal groove portion 12b that is the other linear groove of the bit fitting groove 12. In this case, the horizontal end edge portion 85a and the protrusion 86 formed on the flat blade 84 of the drover bit 80 fit in the horizontal groove 12b of the plus-and-minus screw 10. Thus, the side wall portion 88 of the blade 84 and the protrusion 86 can abut the side wall portion 16b of the horizontal groove portions 12b. Therefore, a desired torque can be transmitted to the plus-and-minus screw 10 at the abutting portions (T3 and T4) of the blade 84 of the driver bit 80 with the horizontal groove 12b of the plus-and-minus screw 10 by rotating the driver bit 80 in the direction of the fastening (see FIG. 28).

Figure 35:
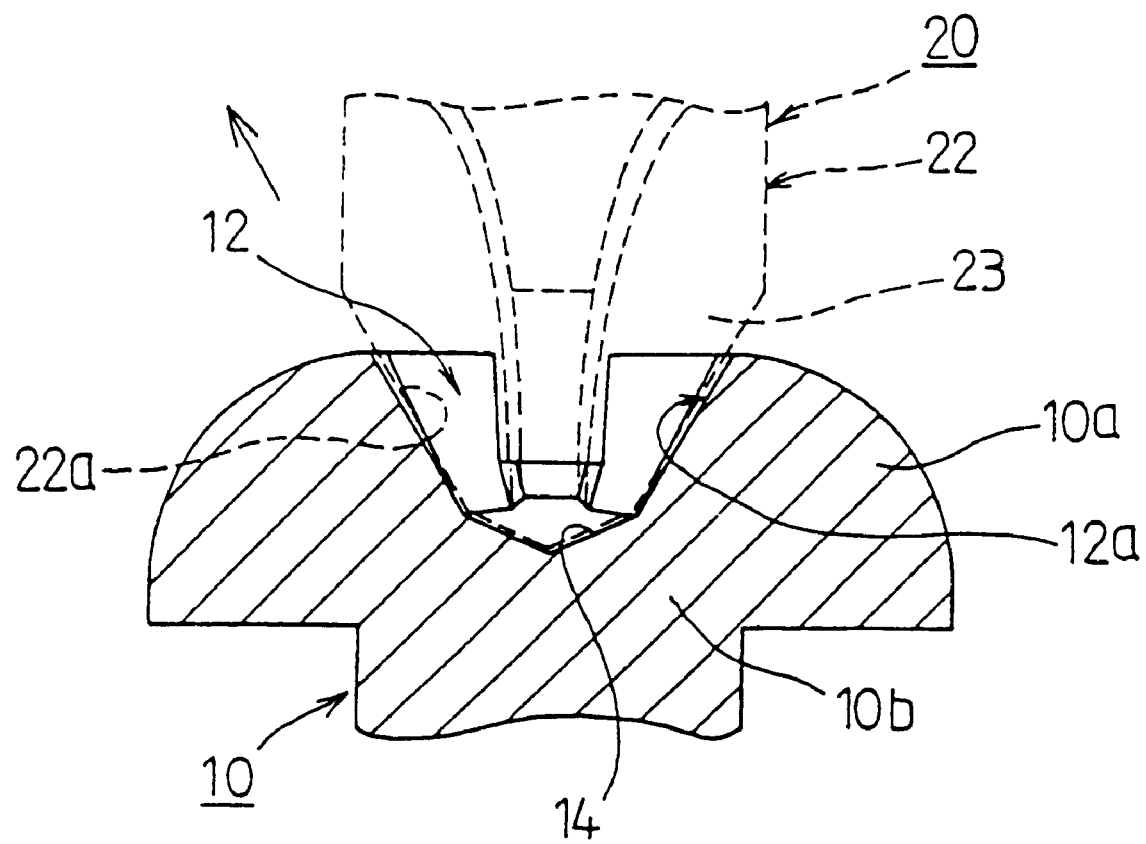
FIG. 35 is a cross section of a side view of a principal portion showing a connection state of the plus-and-minus screw shown in FIG. 33 and the driver bit shown in FIG. 31.

Especially, in this example, as shown in FIG. 27(b), the driving contact and engagement of the side wall portion 16b formed at the horizontal groove portions 12b of the plus-and-minus screw 10 with the side wall 88 of the flat blade 34 can obtain a sufficient contact area compared with the conventional Phillips® screwdriver bit. Therefore, the come-out phenomenon in the screw fastening operation (see FIG. 35) can be prevented effectively.

In addition, according to the driver bit 80 of the present example, a part of each blade 82 or 84 of the driver bit 80 abuts and engages the tapered connection surfaces 17a and 17b formed at the corner portions of the neighboring linear grooves 12a and 12b of the bit fitting groove. Thus, a sufficient torque is transmitted so that correct and secure screw fastening can be achieved.

Therefore, the driver bit 80 of this example having the above-mentioned configuration can transmit a sufficient torque to the liner grooves 62a and 62b of the bit fitting groove 62 also for the plus-and-minus screw 60 shown in FIGS. 15–18, in the same way as mentioned above, by a part of the blades 82 and 84 of the driver bit 80 abuts and engages the liner grooves 62a and 62b, so that correct and secure screw fastening operation can be achieved.

In addition, in the driver bit 80 for the plus-and-minus screw of this example, the blade width (thickness) of the blades 82 and 84 crossing each other is normally set identical to each other. However, the groove width of the horizontal groove portion 12b is set wider than the width of the inclined groove in a bit fitting groove 12 of the general plus-and-minus screw 10 (see FIG. 28). Therefore, if the width of the blade 84 of the driver bit 80 engaging the horizontal groove portion 12b is set thick so as to be adapted to the groove width of the horizontal groove 12b, simultaneous contact can be performed at the contact portion (T1 and T2) between the blade 82 and the inclined groove portion 12a, as well as the contact portion (T3 and T4) between the blade 84 and the horizontal groove portion 12b. Thus, the most effective torque transmission can be achieved.

Therefore, according to the driver bit for the plus-and-minus screw of the present invention, for the loosening operation of the screw apposite to the screw fastening operation mentioned above, the torque transmission similar to the above explanation can be performed, so that correct and secure loosening of screws can be achieved.

Though preferred examples of the present invention are explained, the present invention is not limited to the examples. Various modifications can be performed within the spirit of the present invention.

The screw of the first example of the present invention has substantially vertical side wall portions having a predetermined depth at the end edge portions of the bit fitting groove of the screw head, and non-planar bottom portions raised from the lower edge portion of the vertical side wall portions toward the center portion of the screw head. In addition, inclined groove portions are formed from the raised portion of the non-planar bottom portions toward the center portions of the screw neck. Thus, when the tip of the driver bit engages the bit fitting groove, the tapered contact area of the entire bit fitting groove is partial and small. Furthermore, the non-planar bottom portions is formed in such a way that the area of the side wall portions abutting the tip of the driver bit at the boundary portion between the neighboring bit fitting grooves is enlarged. Thus, the come-out phenomenon of the driver bit is securely prevented.

The plus-and-minus screw of the second example of the present invention is a plus-and-minus screw in which a bit fitting groove comprising of a cross groove is formed in the screw head, one of the crossing linear grooves of the bit fitting groove is formed so that a blade of the Phillips® screwdriver bit can fit in and engage the groove, and the other linear groove is formed so that a flat-blade screwdriver bit can fit in and engage the groove. The plus-and-minus screw has the vertical end wall portion having a predetermined depth at the end edge portion of the one linear groove that the blade of a Phillips® screwdriver bit fits in and engage. Thus, the tapered contact area of the one linear groove is made partial and small upon the engagement of the tip of the driver bit with the bit fitting groove. Further, the groove bottom portion of the bit fitting groove is formed so that the area of the side wall portion that the tip of the driver bit abuts is enlarged. Thus, the com-out phenomenon of the driver bit is securely prevented.

In addition, in the screw of the first example and the plus-and-minus screw of the second example, the bit fitting groove that the blade of the drive bit fits in and engage is formed as a groove whose width is enlarged little by little from the center portion of the screw head toward the outer portion in the radial direction, so that the opening angle of the opposing side wall portion of the neighboring grooves is a little narrower than 90 degrees. Thus, balanced torque transmission is achieved for the screw fastening operation. In addition, in the combination with a driver bit, the com-out phenomenon from the bit fitting groove of the screw can be prevented effectively.

The driver bit adapted to the screw of the first example has a flat blade with a horizontal surface portion at the tip that engages the non-planar bottom portions formed at the end edge portion of the bit fitting groove of the screw, and a protrusion formed on the tip of the blade to be adapted to the shape of the groove portion extending from the non-planar bottom portions. Thus, the most suitable driver bit for the screw can be obtained.

Furthermore, the driver bit adapted to the plus-and-minus screw of the second example has flat blades having the substantially horizontal surface portions at the tip engaging the groove bottom portions formed at the end edge portion of the one linear groove of the screw, and protrusions adapted to the shape of the groove portions extending from the groove bottom portions at the end edge portion of the blade. Thus, the most suitable driver bit for the plus-and-minus screw can be obtained.

In addition, in the present invention, the screws can be mass-produced easily and in low cost by using the header punch having the protrusions or the protruding lines that are adapted to the shape of the bit fitting groove of the screw and the plus-and-minus screw.

Especially, in the forming process of the bit fitting groove of the screw head of the screw and the plus-and-minus screw of the present invention, the non-planar bottom portions raised from the lower edge portion of the vertical end edge portion toward the center of the screw head by using the protrusions or the protruding lines of the header punch. In the mass-production of the screws, even if the protrusions or the protruding lines are worn a little, the forming of the raised non-planar bottom portions is not influenced at all. Thus, the screws and plus-and-minus screws of the present invention can be mass-produced in a low cost.

In addition, in the forming process of the bit fitting groove of the screw head in the present invention, the raised portion from the end edge portion of the vertical end wall portion toward the center portion of the screw head can keep the thickness of the screw neck properly, so that the screw having sufficient strength for fastening and loosening can be produced.

The screw and the plus-and-minus screw of the present invention has a tapered contact area of the entire bit fitting groove that is basically partial and small upon engagement with the driver bit. In addition, the area of the side wall portion of the bit fitting groove that the tip of the driver bit abuts is enlarged. Therefore, the com-out phenomenon of the driver bit is canceled substantially. This effect is performed also when the conventional drive bit shown in FIG. 31 is used. Therefore, the screw and the plus-and-minus screw of the present invention can achieve correct screw fastening operation even if the driver bit shown in FIG. 31 is used. Especially, in the combination with the screw shown in FIG. 3 or with the plus-and-minus screw shown in FIG. 18, automatic machine can be used in the production line for fastening screws and the screw fastening operation can be achieved smoothly.

In addition, according to the screw and the plus-and-minus screw of the present invention, even if the breakage (reference numeral 15) shown in FIG. 30 or 34, for example, in a part of the bit fitting groove of the screw head due to the come-out phenomenon, proper fastening and loosening operation of the screw can be achieved without the come-out phenomenon by using the driver bit of the present invention.

In addition, according to the combination of the screw or the plus-and-minus screw and the driver bit of the present invention, even if the bit fitting groove of the screw is blocked with dust or the screw axis and the bit axis are not coaxial, the com-out phenomenon or a breakage of the screw does not occur. Thus, the rotation of the driver bit can be transmitted to the screw smoothly and the normally proper torque is applied so that the screw fastening operation can be achieved quickly.

Namely, by using the combination of the screw or the plus-and-minus screw and the driver bit of the present invention, normally proper torque is applied to a hard or soft object that the screw is fastened for secure screw-fastening operation. In addition, the breakage of the screw is reduced substantially, so that the safety of the screw-fastening operation and the working efficiency can be improved easily and economically.

In addition, the driver bit for the plus-and-minus screw of, the third example of the present invention is a driver bit for the plus-and-minus screw adapter to plus-and-minus screws having the bit fitting groove formed by a pair of linear grooves consisting of the inclined groove portion and the horizontal groove portion crossing each other at the center portion of the screw head. The drive bit has, the flat blade forming the inclined end edge portion fitting in along the inclined groove portions of the plus-and-minus screw, and the flat blade forming the horizontal end edge portion crossing the flat blade and fitting in along the horizontal groove portions, and extending substantially perpendicular to abut the groove bottom portion of the horizontal groove portion. The tip center portion of each blade is provided with a protrusion fitting in the conical-shaped bottom portion. Thus, in the same way as the other examples, upon the engagement with the screw, the engaging contact area of the side wall portion of the tip portion with the side wall portion of the bit fitting groove is enlarged. Therefore, the come-out phenomenon of the driver bit is prevented so that a proper screw-fastening operation and the screw-loosening operation can be achieved.

Other embodiments of the invention will be apparent to those skilled in the art from consideration of the specification and practice of the invention disclosed herein. It is intended that the specification and examples be considered as exemplary only. Thus, it should be understood that the invention is not limited to the illustrative examples in this specification. Rather, the invention is intended to cover all modifications and variations that come within the scope of the following claims and their equivalents.

APPENDIX E

| Element | Reference Character |
|---|---|
| screw | 10 |
| screw head | 10a |
| screw neck | 10b |
| grooves | 12 |
| groove portions or grooves | 12a, 12b |
| tapered wall | 13 |
| bottom surface | 14 |
| hatching portion | 15 |
| connection surfaces | 17a, 17b |
| driver bit | 20 |

APPENDIX E-continued

| Element | Reference Character |
|---|---|
| blades | 22 |
| extension blade | 22a |
| tapered side walls | 23 |
| screw | 30 |
| screw head | 30a |
| head portion | 30b |
| head or top surface | 30c |
| bit fitting groove | 32 |
| end or lateral wall | 32a |
| lower edge corner portion | 32a' |
| inclined portion | 32a" |
| inclined wall bottom portion | 32b |
| raised or corner portion | 32b' |
| inclined groove or wall portion | 32c |
| tapered portion | 32d |
| side wall | 33 |
| tapered sidewall portions or grooves | 33a, 33b |
| opening angle | $\beta$ |
| bottom surface | 34 |
| tapered connection surfaces | 37a, 37b |
| driver bit | 40 |
| blade | 42 |
| tip surface | 42a |
| end edge portion | 42a' |
| protrusion | 42b |
| vertical protrusion | 42c |
| side wall portions | 43, 43a, 43b, T1, T2, T3, T3', T4' |
| torques | $\tau 0, \tau 1$ |
| Bit axis | L1 |
| screw axis | L0 |
| slant angle | $\theta$ |
| header punch | 50 |
| protrusion | 52 |
| protruding edge portions | 52a, 52a" |
| protrusion line | 52b |
| plus-and-minus screw | 60 |
| screw head | 60a |
| screw neck | 60b |
| bit fitting groove | 62 |
| grooves | 62a, 62b, 62a', 62b' |
| end wall portion | 63a |
| lower edge portion | 63a' |
| bottom portion | 63b |
| groove portion | 63c |
| bottom surface | 64 |
| side wall portions | 65a, 65b |
| connection surfaces | 67a, 67b |
| clearance | $\delta$ |
| driver bit | 70 |
| blade | 72 |
| horizontal surfaces | 73a |
| end edge portion | 73a' |
| protrusions | 73b, 73c |
| side wall portions | 75, 75a, 75b |
| driver bit | 80 |
| blades | 82 |
| end edge portion | 83a |
| vertical surface portion | 83b |
| inclined surface portion | 83c |
| blade | 84 |
| end edge portion | 85a |
| vertical surface portion | 85b |
| inclined surface portion | 85c |
| protrusion | 86 |
| side wall portions | 87, 88 |
| header punch | 90 |
| protrusions | 92a, 92b, 93 |
| inclined protrusion line | 93c |
| side wall portions | 95a, 95b |

What is claimed:
1. A screw comprising:
 a screw head defining a head surface extending along a direction substantially perpendicular to a longitudinal axis of the screw;
 a plurality of bit fitting grooves each having an end wall portion extending along a direction substantially parallel to the longitudinal axis of the screw from the head surface of the screw head to a lower edge portion, a bottom portion extending along a direction substantially perpendicular to the longitudinal axis from the lower edge portion of the end wall portion to a raised portion of the screw, an inclined surface portion formed so as to extend along a direction transverse to the longitudinal axis of the screw from the raised portion of the bottom portion to a lower portion of the screw, and a substantially conical-shaped bottom surface extending from the lower portion of the inclined surface portion of each of the bit fitting grooves of the screw.

2. The screw according to claim 1, wherein each of the bit fitting grooves are shaped to receive and enclose respective portions of two perpendicular blades of a driver bit, and the bit fitting grooves include first and second side wall portions wherein a distance between the first and second side wall portions gradually increases along a radial direction substantially parallel to the head surface of the screw head.

3. A screw and driver bit apparatus comprising:

a screw having a screw head defining a head surface extending along a direction substantially perpendicular to a longitudinal axis of the screw, a plurality of bit fitting grooves each having an end wall portion extending along a direction substantially parallel to the longitudinal axis of the screw from the head surface of the screw head to a lower edge portion, a bottom portion extending along a direction substantially perpendicular to the longitudinal axis from the lower edge portion of the end wall portion to a raised portion of the screw, an inclined surface portion formed so as to extend along a direction transverse to the longitudinal axis of the screw from the raised portion of the bottom portion to a lower portion of the screw, a substantially conical-shaped bottom surface extending from the lower portion of the inclined surface portion of each of the bit fitting grooves of the screw; and a driver bit having a plurality of blades each shaped to complement and fit into one of the bit fitting grooves of the screw and abut the bottom portion of each of the bit fitting grooves, said plurality of blades having end edge portions each extending along a direction substantially parallel to a longitudinal axis of the driver bit so as to match respective end wall portions of the bit fitting grooves of the screw head, a plurality of tip surfaces each extending from the end edge portions along a direction substantially perpendicular to the longitudinal axis of the driver bit, and a protrusion extending from each of the tip surfaces along a direction substantially parallel to the longitudinal axis of the driver bit.

4. A screw and driver bit apparatus comprising:

a screw having a screw head defining a head surface extending along a direction substantially perpendicular to a longitudinal axis of the screw, a plurality of bit fitting grooves each having an end wall portion extending along a direction substantially parallel to the longitudinal axis of the screw from the head surface of the screw head to a lower edge portion, a bottom portion extending along a direction substantially perpendicular to the longitudinal axis from the lower edge portion of the end wall portion to a raised portion of the screw, an inclined surface portion formed so as to extend along a direction transverse to the longitudinal axis of the screw from the raised portion of the bottom portion to a lower portion of the screw, a substantially conical-shaped bottom surface extending from the lower portion of the inclined surface portion of each of the bit fitting grooves of the screw; and a driver bit having a plurality of blades each shaped to complement and fit into one of the bit fitting grooves of the screw and abut the bottom portion of each of the bit fitting grooves, said plurality of blades having end edge portions, wherein the end edge portions of said plurality of blades are each inclined relative to a direction parallel to the longitudinal axis of the driver bit, a plurality of tip surfaces each extending from the end edge portions along a direction substantially perpendicular to the longitudinal axis of the driver bit, and a protrusion extending from each of the tip surfaces along a direction substantially parallel to the longitudinal axis of the driver bit.

5. The apparatus according to claim 3, wherein the protrusion is shaped so as to complement and fit against the inclined surface portions and the conical-shaped bottom surface of the screw.

6. A screw and header punch screw manufacturing apparatus comprising:

a screw having a screw head defining a head surface extending along a direction substantially perpendicular to a longitudinal axis of the screw, a plurality of bit fitting grooves each having an end wall portion extending along a direction substantially parallel to the longitudinal axis of the screw from the head surface of the screw head to a lower edge portion, a bottom portion extending along a direction substantially perpendicular to the longitudinal axis from the lower edge portion of the end wall portion to a raised portion of the screw, an inclined surface portion formed so as to extend along a direction transverse to the longitudinal axis of the screw from the raised portion of the bottom portion to a lower portion of the screw, and a substantially conical-shaped bottom surface extending from the lower portion of the inclined surface portion of each of the bit fitting grooves of the screw; and a header punch including protrusions having protruding portions shaped to punch out and form the end wall portions and the bottom portions of each of the bit fitting grooves of the screw, and protruding surfaces shaped to form said inclined surface portions extending along a direction transverse to a longitudinal axis of the header punch from said protruding edge portions.

7. The apparatus according to claim 6, wherein each of the bit fitting grooves are configured to receive perpendicular blades of a driver bit, and the bit fitting grooves include first and second inclined side wall portions that form a gradually enlarged width of each of the bit fitting grooves relative to a radial direction substantially parallel to the head surface of the screw head, and side walls of the protrusions of the header punch are shaped to fit within the first and second side wall portions of the bit fitting grooves of the screw.

8. A screw and driver bit apparatus comprising:

a screw having a screw head defining a head surface extending along a direction substantially perpendicular to a longitudinal axis of the screw, a plurality of bit receiving grooves each having an end wall portion extending along a direction substantially parallel to the longitudinal axis of the screw from the head surface of the screw head to a lower edge portion, a bottom portion extending along a direction substantially perpendicular to the longitudinal axis from the lower edge portion of the end wall portion to a raised portion of the screw, an inclined surface portion formed so as to extend along a direction transverse to the longitudinal axis of the screw from the raised portion of the bottom portion to a lower portion of the screw, a substantially conical-shaped bottom surface extending from the lower portion of the inclined surface portion of each of the bit fitting grooves of the screw;

wherein each of the bit fitting grooves are shaped to receive and enclose respective portions of two perpendicular blades of a driver bit, and the bit fitting grooves include first and second side wall portions wherein a distance between the first and second side wall portions gradually increases along a radial direction substantially parallel to the head surface of the screw head; and the driver bit including a blade having end edge portions each extending along a direction substantially parallel to a central axis of the driver bit so as to match respective end wall portions of the bit fitting grooves of the screw head, tip surfaces each extending from the end edge portions along a direction substantially perpendicular to the central axis of the driver bit, and a protrusion extending from each of the tip surfaces along a direction substantially parallel to the central axis of the driver bit.

9. The apparatus according to claim 8, wherein each blade includes first and second tapered side walls shaped to complement and fit into the gradually enlarged width of each of the bit fitting grooves.

10. The apparatus according to claim 8, wherein the protrusion is shaped to complement and fit against the inclined surface portions and the conical-shaped bottom surface of the screw.

11. A screw and driver bit apparatus comprising:

a screw having a screw head defining a head surface extending along a direction substantially perpendicular to a longitudinal axis of the screw, a plurality of bit receiving grooves each having an end wall portion extending along a direction substantially parallel to the longitudinal axis of the screw from the head surface of the screw head to a lower edge portion, a bottom portion extending along a direction substantially perpendicular to the longitudinal axis from the lower edge portion of the end wall portion to a raised portion of the screw, an inclined surface portion formed so as to extend along a direction transverse to the longitudinal axis of the screw from the raised portion of the bottom portion to a lower portion of the screw, a substantially conical-shaped bottom surface extending from the lower portion of the inclined surface portion of each of the bit fitting grooves of the screw;

wherein each of the bit fitting grooves are shaped to receive and enclose respective portions of two perpendicular blades of a driver bit, and the bit fitting grooves include first and second side wall portions wherein a distance between the first and second side wall portions gradually increases along a radial direction substantially parallel to the head surface of the screw head; and the driver bit including a blade having end edge portions, wherein the end edge portions are inclined relative to a direction parallel to the central axis of the driver bit, tip surfaces each extending from the end edge portions along a direction substantially perpendicular to the central axis of the driver bit, and a protrusion extending from each of the tip surfaces along a direction substantially parallel to the central axis of the driver bit.

* * * * *